(12) United States Patent
He et al.

(10) Patent No.: US 9,028,362 B2
(45) Date of Patent: May 12, 2015

(54) POWERTRAIN AND METHOD FOR A KINETIC HYBRID VEHICLE

(76) Inventors: Jing He, Burbank, CA (US); Hongping He, Bakersfield, CA (US)

( * ) Notice: Subject to any disclaimer, the term of this patent is extended or adjusted under 35 U.S.C. 154(b) by 688 days.

(21) Appl. No.: 13/193,728

(22) Filed: Jul. 29, 2011

(65) Prior Publication Data

US 2012/0196721 A1 Aug. 2, 2012

Related U.S. Application Data

(60) Provisional application No. 61/438,267, filed on Feb. 1, 2011, provisional application No. 61/471,213, filed on Apr. 4, 2011, provisional application No. 61/495,993, filed on Jun. 11, 2011.

(51) Int. Cl.
| | |
|---|---|
| *F16H 3/72* | (2006.01) |
| *B60K 6/10* | (2006.01) |
| *B60K 6/365* | (2007.10) |
| *B60K 6/52* | (2007.10) |
| *F16H 37/08* | (2006.01) |

(52) U.S. Cl.
CPC .............. B60K 6/105 (2013.01); *Y10T 477/675* (2015.01); *Y10T 477/23* (2015.01); B60K 6/365 (2013.01); B60K 6/52 (2013.01); *Y02T 10/6204* (2013.01); *F16H 3/724* (2013.01); *F16H 2037/088* (2013.01); *F16H 2200/2005* (2013.01); *F16H 2200/2007* (2013.01); *Y02T 10/6265* (2013.01)

(58) Field of Classification Search
None
See application file for complete search history.

(56) References Cited

U.S. PATENT DOCUMENTS

| | | | |
|---|---|---|---|
| 4,171,029 A | 10/1979 | Beale | |
| 4,471,668 A * | 9/1984 | Elsner | 475/72 |
| 4,588,040 A * | 5/1986 | Albright et al. | 180/165 |
| 4,625,823 A | 12/1986 | Frank | |
| 4,679,646 A | 7/1987 | Greenwood | |
| 4,928,553 A | 5/1990 | Wagner | |
| 5,024,633 A * | 6/1991 | Schmidt | 475/72 |
| 5,558,589 A | 9/1996 | Schmidt | |
| 6,394,924 B1 | 5/2002 | Schiebold | |
| 6,505,109 B1 | 1/2003 | Strandell | |
| 6,551,208 B1 | 4/2003 | Holmes | |
| 6,710,579 B2 | 3/2004 | Ebel | |
| 6,962,223 B2 | 11/2005 | Berbari | |
| 7,022,038 B2 | 4/2006 | Schmidt | |
| 7,341,534 B2 | 3/2008 | Schmidt | |
| 7,455,608 B2 | 11/2008 | Moeller | |
| 7,473,200 B2 | 1/2009 | Raghavan | |

(Continued)

OTHER PUBLICATIONS

Blass, Evan, "GyroBike flywheel helps bicycles self steady," Engadget, Apr. 28, 2006, http://www.engadget.com/2006/04/28/gyrobike-flywheel-helps-bicycles-self-steady.

(Continued)

*Primary Examiner* — Erin D Bishop
(74) *Attorney, Agent, or Firm* — Manuel F. de la Cerra

(57) ABSTRACT

A kinetic hybrid device and method for a vehicle may include a planetary gear system configured as a continuously variable transmission comprised of three or four ports. The kinetic hybrid device and method may include a flywheel connected to a first port of the system, a final drive connected to a second port of the system, and the variator for the flywheel connected to a third or fourth port of the system. The prime mover and/or other power sources may share a port with the flywheel, but do not share a port with the final drive.

11 Claims, 23 Drawing Sheets

(56) References Cited

U.S. PATENT DOCUMENTS

| | | |
|---|---|---|
| 7,473,201 B2 | 1/2009 | Raghavan |
| 7,479,091 B2 | 1/2009 | Yang |
| 7,491,144 B2 | 2/2009 | Conlon |
| 7,540,346 B2 | 6/2009 | Hu |
| 7,544,141 B2 | 6/2009 | Holmes |
| 7,601,092 B2 | 10/2009 | Holmes |
| 7,704,176 B2 | 4/2010 | Holmes |
| 8,398,515 B2 * | 3/2013 | Sartre et al. .................. 475/6 |
| 8,496,553 B2 * | 7/2013 | Tanaka et al. .................. 475/5 |
| 2002/0055407 A1 | 5/2002 | Druten |
| 2003/0186769 A1 | 10/2003 | Ai |
| 2006/0048516 A1 | 3/2006 | Tenbrock |
| 2006/0108162 A1 * | 5/2006 | Tabata et al. .................. 180/65.2 |
| 2008/0308335 A1 | 12/2008 | Anderson |
| 2009/0037060 A1 | 2/2009 | Carlhammar |
| 2009/0082171 A1 | 3/2009 | Conlon |
| 2009/0182466 A1 | 7/2009 | Watanabe |
| 2010/0151980 A1 | 6/2010 | Bowman |
| 2010/0152982 A1 | 6/2010 | Bowman |
| 2010/0152984 A1 | 6/2010 | Bowman |
| 2010/0184549 A1 * | 7/2010 | Sartre et al. .................. 475/5 |
| 2010/0185352 A1 | 7/2010 | Bowman |
| 2010/0192708 A1 | 8/2010 | Kees |
| 2010/0280712 A1 | 11/2010 | Bowman |
| 2010/0304920 A1 | 12/2010 | Simon |

OTHER PUBLICATIONS

Barry, Keith, "Volvo Gets More Power From Less Fuel, No Batteries Required," WIRED, May 31, 2011, http://www.wired.com/autopia/2011/05/volvo-flywheel-hybrid.

* cited by examiner

- Acceleration Efficiency at point a and d: 0.77X0.80 = 62%
- Cruise Efficiency at point b and f: 0.96X0.80 = 77%
- Regenerative braking Efficiency at point h, a, a, d: 0.80X0.77X0.77X0.80 = 38%
- Highest Efficiency could be at point e or g and c: 0.94 X 0.91 = 86%

$$(k+1)\,\omega_c = k\omega_r + \omega_s \qquad (1)$$
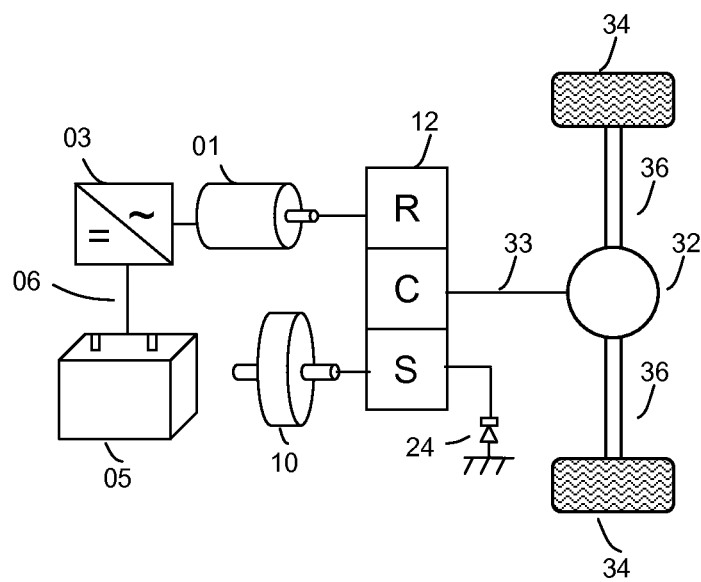
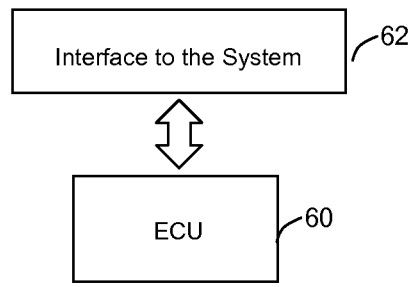
Fig. 2

$$(k+1)\omega c = k\omega r + \omega s \quad (1)$$
→ Motion direction    ⇒ Torque direction
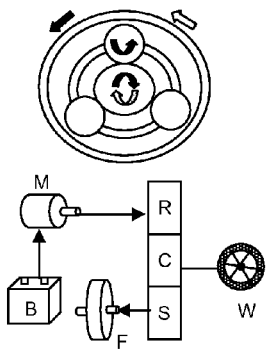
Fig. 3a: Pre-charge
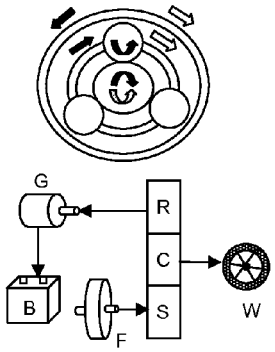
Fig. 3b: Acceleration 1
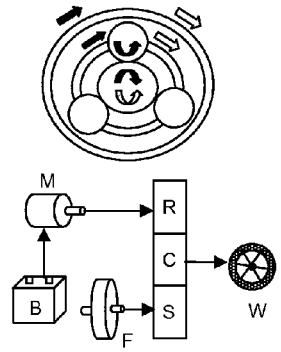
Fig. 3c: Acceleration 2
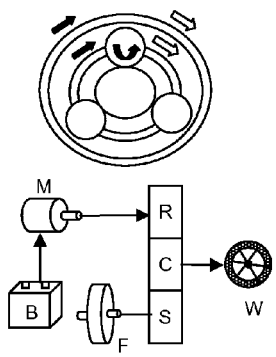
Fig. 3d: Cruise
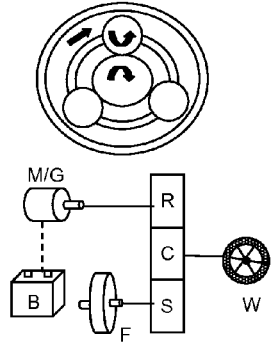
Fig. 3e: Coast / neutral
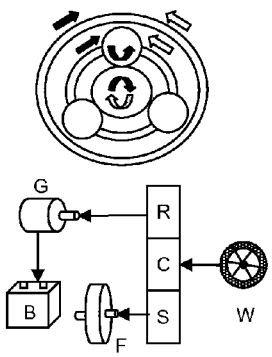
Fig. 3f: Deceleration1
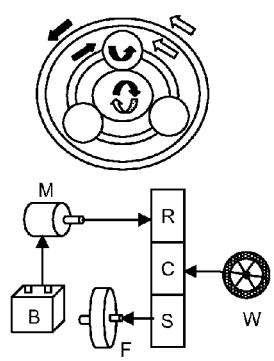
Fig. 3g: Deceleration2
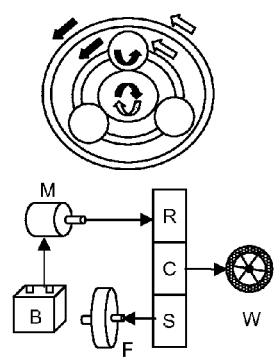
Fig. 3h: Reverse
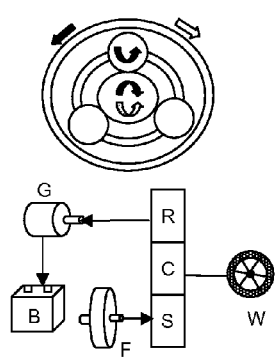
Fig. 3i: Restore $$(k+1)\,\omega c = k\omega r + \omega s \qquad (1)$$
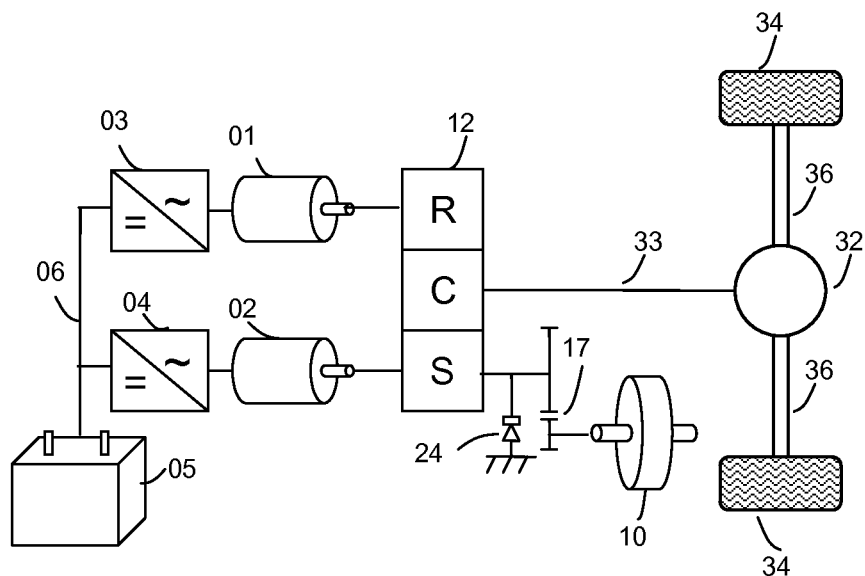
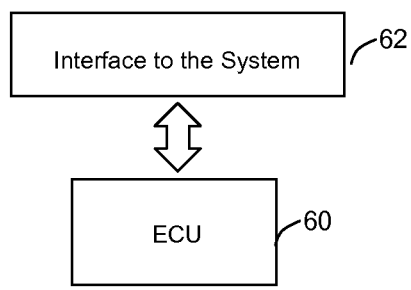
Fig. 5

$$(k+1)\omega c = k\omega r + \omega s \quad (1)$$
■→ Motion direction   ⇨ Torque direction
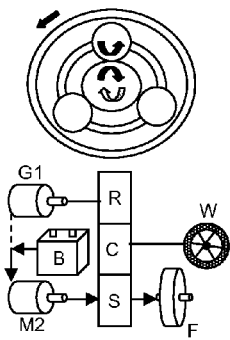
Fig. 6a: Pre-charge
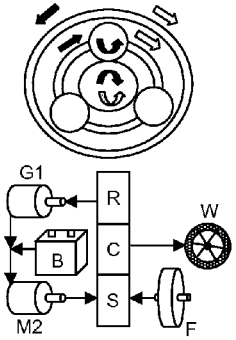
Fig. 6b: Acceleration1
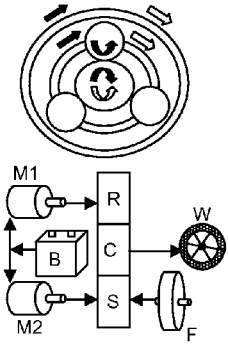
Fig. 6c: Acceleration2
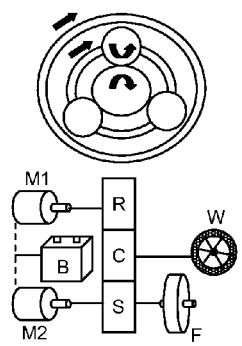
Fig. 6d: Neutral / Coast
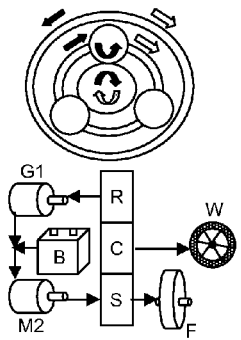
Fig. 6e: Cruise 1
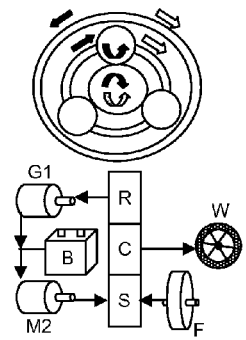
Fig. 6f: Cruise 2
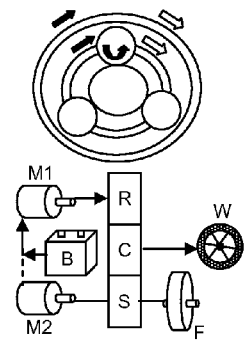
Fig. 6g: Cruise 3
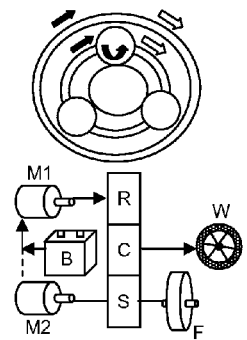
Fig. 6h: Cruise 4
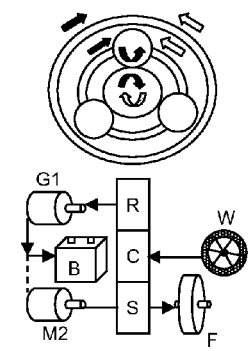
Fig. 6i: Deceleration 1
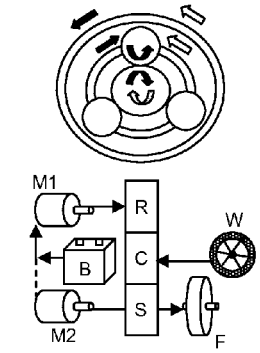
Fig. 6j: Deceleration 2
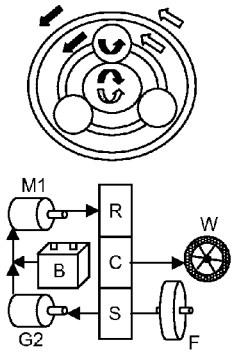
Fig. 6k: Reverse
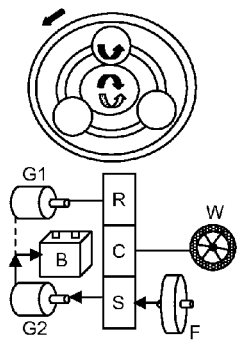
Fig. 6m: Restore

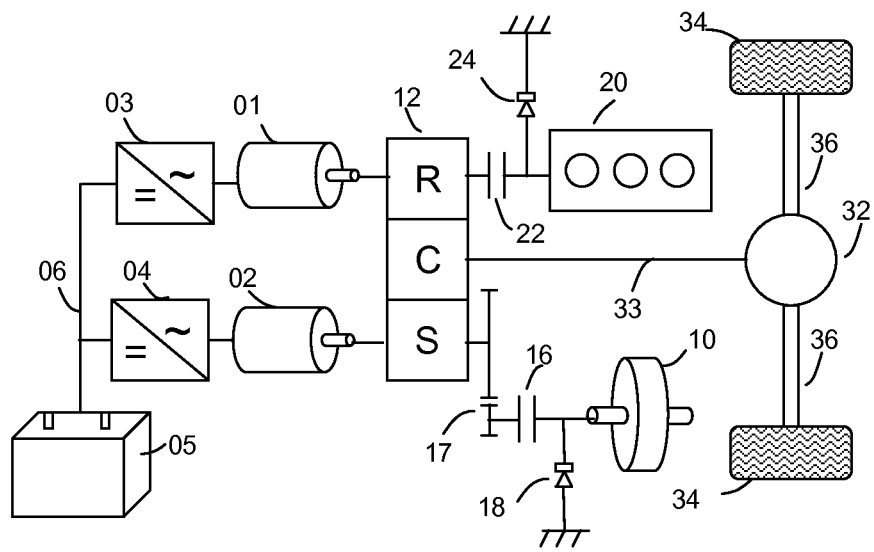
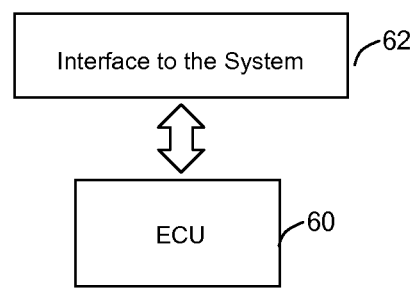
Fig. 8

$$(k+1)\omega_c = k\omega_r + \omega_s \quad (1)$$
Motion direction → Torque direction ⇒
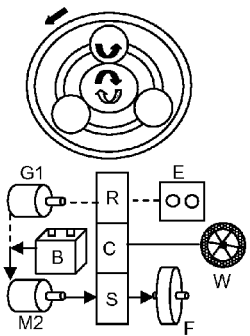
Fig.9a: Pre-charge
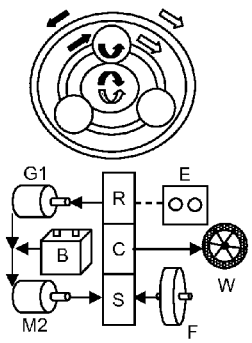
Fig.9b: Acceleration 1
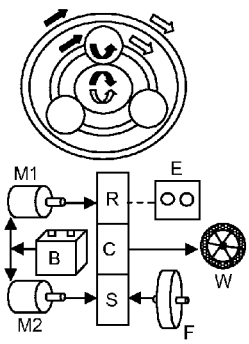
Fig.9c: Acceleration 2
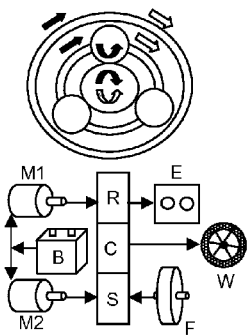
Fig.9d: Start engine
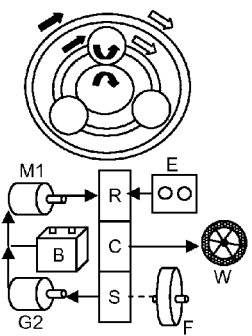
Fig.9e: Cruise 1
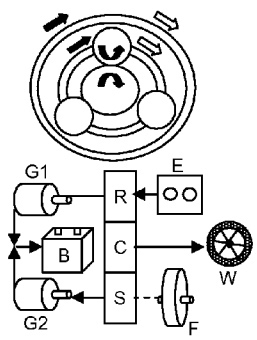
Fig.9f: Cruise 2
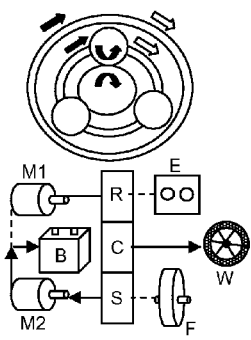
Fig.9g: Cruise 3
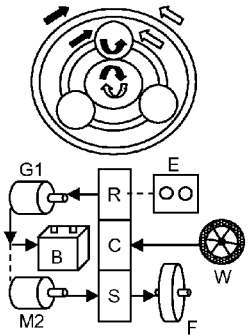
Fig.9h: Deceleration 1
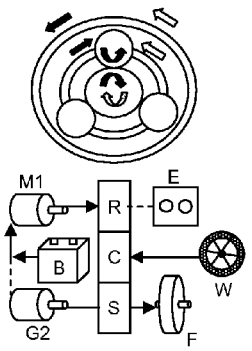
Fig.9i: Deceleration 2
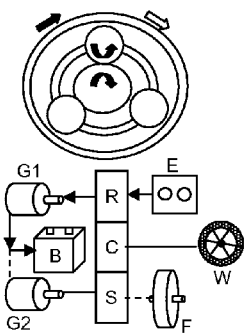
Fig.9j: Neutral battery charge
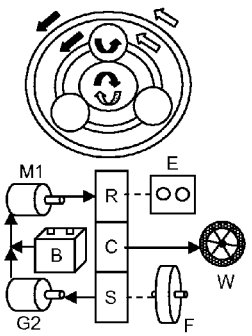
Fig.9k: Reverse
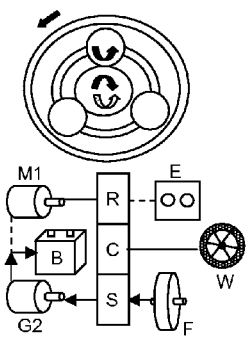
Fig.9m: Restore $$(k+1)\omega_c = k\omega_r + \omega_s \quad (1)$$
Motion direction → Torque direction ⇒
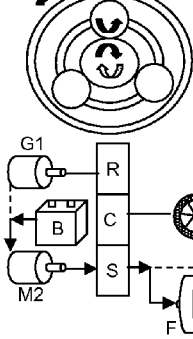
Fig.11a: Pre-charge
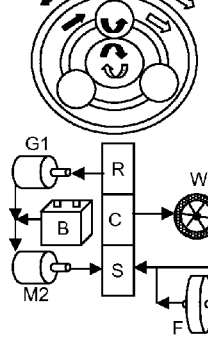
Fig.11b: Start engine
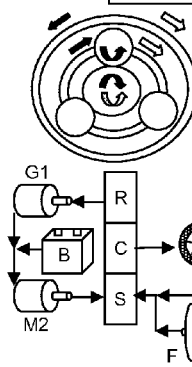
Fig.11c: Acceleration 1
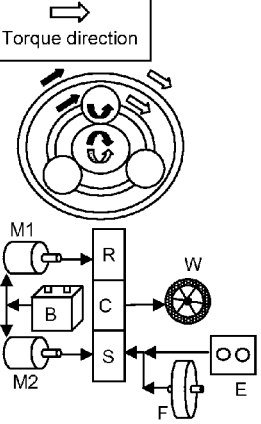
Fig.11d: Acceleration 2
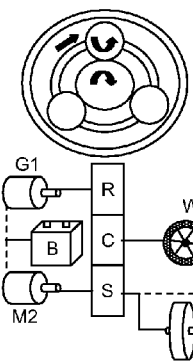
Fig.11e: Coast / Neutral
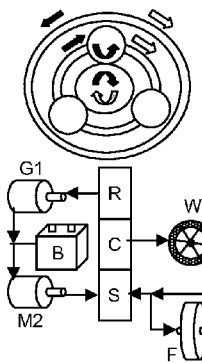
Fig.11f: Cruise 1
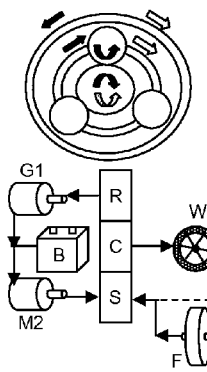
Fig.11g: Cruise 2
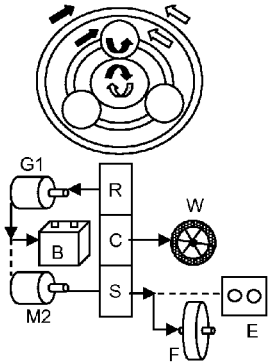
Fig.11h: Deceleration 1
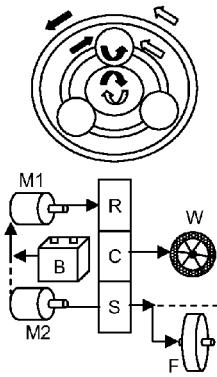
Fig.11i: Deceleration 2
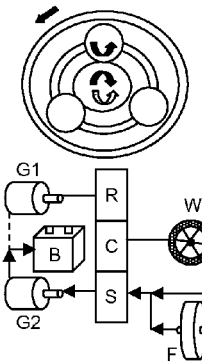
Fig.11j: Neutral battery charge
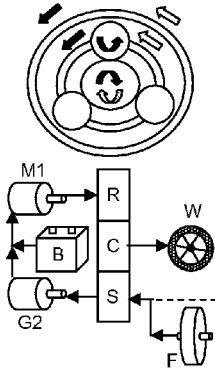
Fig.11k: Reverse
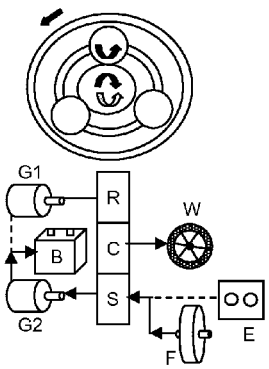
Fig.11m: Restore

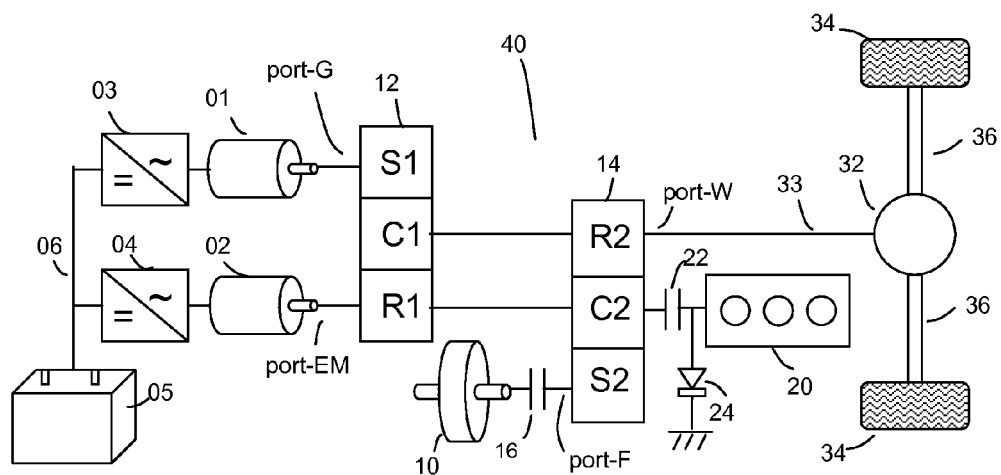
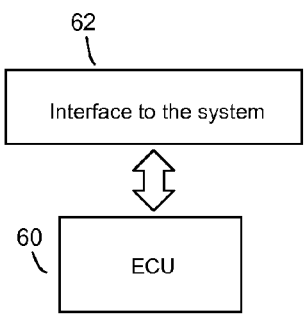
Fig. 13

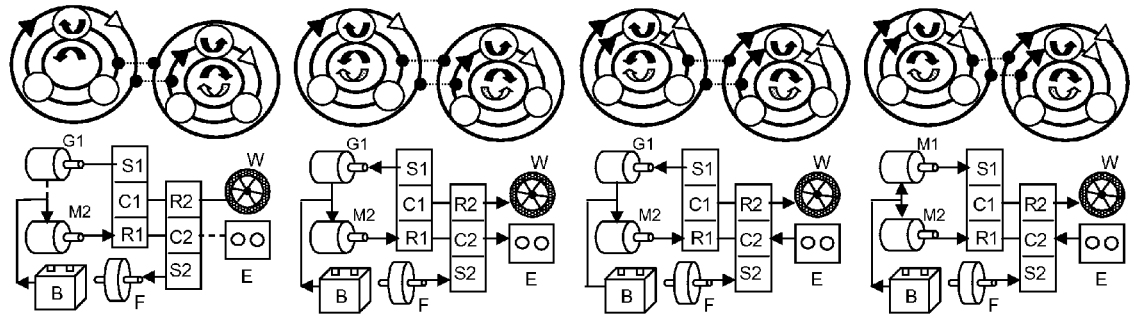
Fig. 18a: Pre-charge    Fig. 18b: Start    Fig. 18c: Acceleration 1    Fig. 18d: Acceleration 2
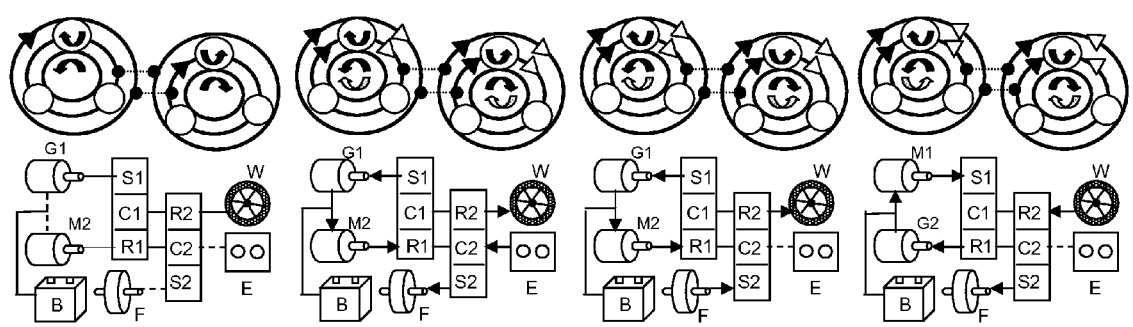
Fig. 18e: Coast / Neutral    Fig. 18f: Cruise 1    Fig. 18g: Cruise 2    Fig. 18h: Deceleration 1
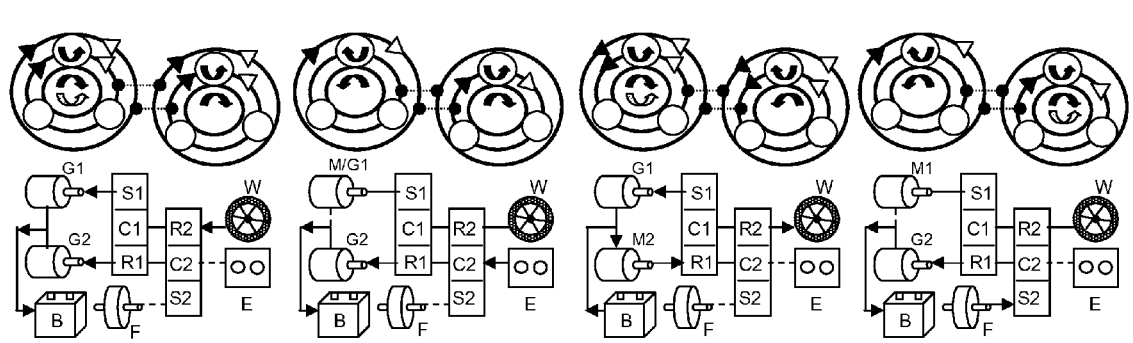
Fig. 18i: Deceleration 2    Fig. 18j: Neutral / Bat charge    Fig. 18k: Reverse    Fig. 18m: Restore

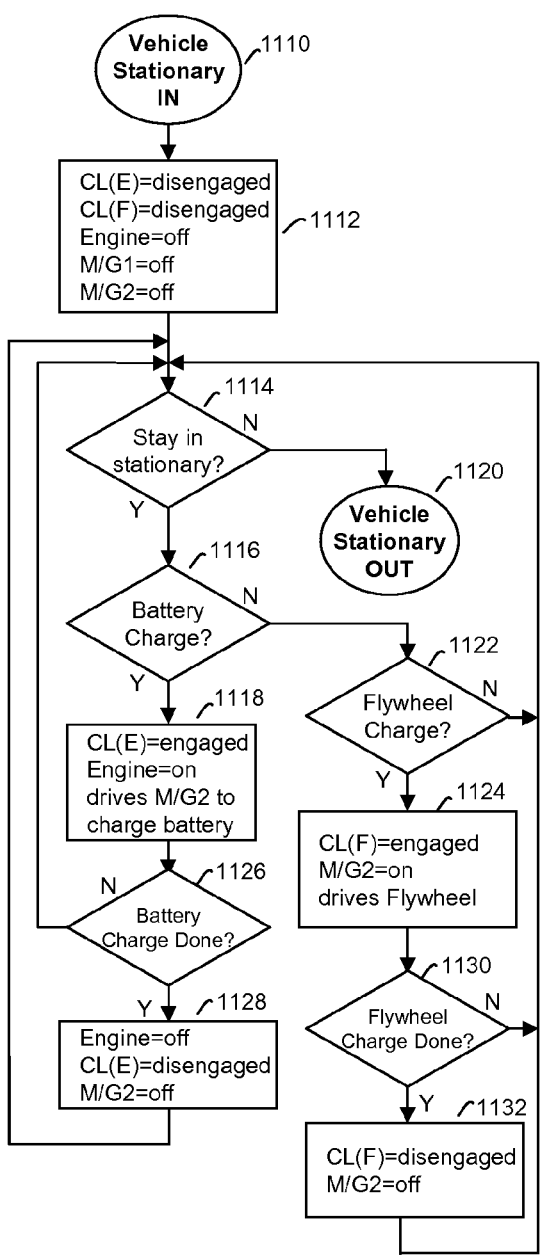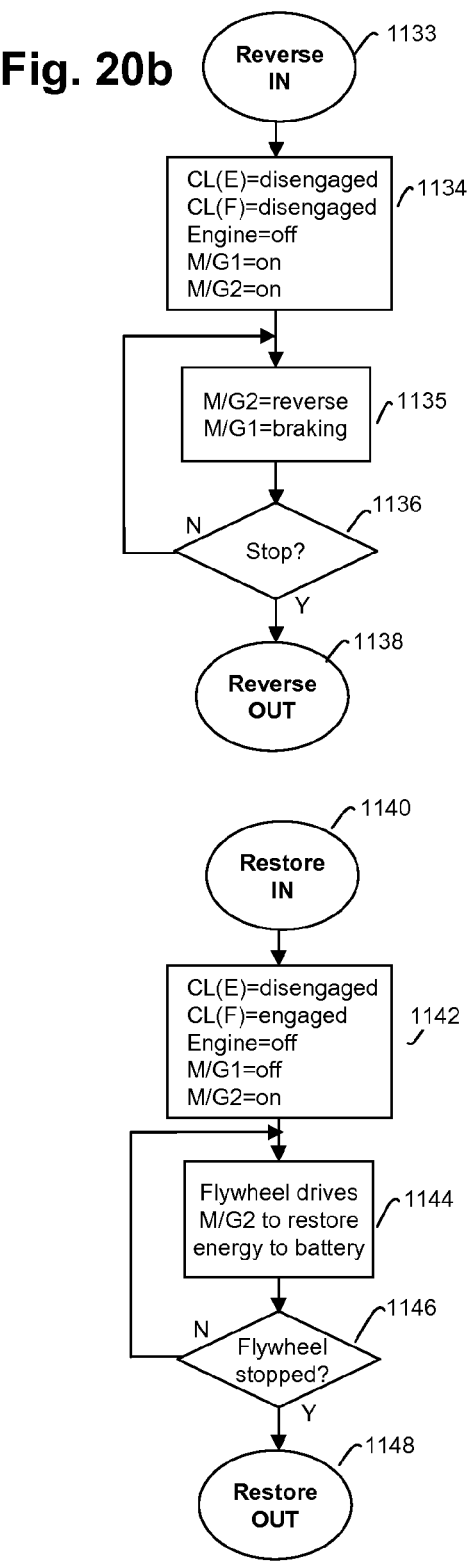
Fig. 20b
Fig. 20a
Fig. 20c

POWERTRAIN AND METHOD FOR A KINETIC HYBRID VEHICLE

CROSS REFERENCE TO RELATED APPLICATION(S)

This application claims priority from U.S. Provisional Patent Application Ser. Nos. 61/438,267 filed Feb. 1, 2011; 61/471,213, filed Apr. 4, 2011; and 61/495,993, filed Jun. 11, 2011, and which all are incorporated by reference herein.

BACKGROUND OF THE INVENTION

1. Field of the Invention

This invention pertains to a powertrain and method of a kinetic hybrid vehicle, such as a gas and/or electric powered vehicle that includes a flywheel. The powertrain and method may be used to store and use energy of the flywheel device for vehicle propulsion.

2. Description of the Related Art

Improving fuel economy is an important objective in vehicle design, since it enables reduced fuel consumption and reduced emissions. In a conventional vehicle powered by an internal combustion engine, fuel economy is generally inversely related to vehicle performance, as the engine generally cannot be downsized to be run at its optimal efficiency without sacrificing performance. Acceleration performance is seen in how much reserve power the vehicle has to overcome its own inertia and increase its speed. The more reserve power, the more quickly the desired acceleration or speed can be achieved, and the better the performance of the vehicle. Hence for performance considerations, the bigger the engine in conventional vehicles, the more reserve power there is to accelerate the vehicle relatively quickly and overcome inertia. On the other hand, this means that when the vehicle is not accelerating, its engine is operating at a lower load level and lower efficiency state, wasting the maximum efficiency potential of the engine. In addition, much of the vehicle's kinetic energy is dissipated as heat in the brakes when decelerating, reducing the vehicle's potential fuel efficiency.

Hybrid electric vehicles (HEVs), which are equipped with another power source and energy storage, may recover a portion of the vehicle's kinetic energy during deceleration, and can use a downsized engine for increased fuel efficiency. By supplementing the power from a smaller engine with power from a traction motor, HEVs can run the engine at increased efficiency compared to conventional vehicles without sacrificing performance. Although more efficient and environment friendly than some conventional vehicles, these electric hybrids may be difficult to produce without the added costs of a large traction motor, controller, and electrochemical and/or electric storage devices. These costs may result in an increased price to consumers that limits market penetration.

Aside from cost, a main disadvantage of electric hybrids is that they are greatly limited in the fuel economy improvements they can provide. Part of conventional electric hybrids' efficiency limitations comes from the fact that energy is not stored in the same form it is used in. When energy from the engine or the vehicle is stored as electricity, there are multiple conversions from mechanical to electric, from electric to electrochemical, from electrochemical to electric, and from electric to mechanical. There are typically four energy transformations by the time the energy is used, each resulting in a conversion loss. These conversion losses typically comprise above one-third the original amount of energy initially recovered, such as from braking. Another part of conventional electric hybrids' efficiency limitations comes from the inherent characteristics of motor/generators and batteries—namely, their power transfer limitations and reduced efficiency at high rates of charge and discharge. Even when the electric storage consists of ultracapacitors, which are highly efficient at high rates of charge and discharge, the energy regenerated from deceleration is limited by the power of the traction motor. Thus only a small portion of the vehicle's kinetic energy may be recovered via regenerative braking in electric hybrids.

To avoid conversion losses and improve fuel economy, an alternative energy storage device is available: the flywheel. Flywheels have much higher power density and can give and receive much higher power than motor/generators, and since flywheels store energy in the same form that it is to be used in for vehicle propulsion, they are more efficient than electrical energy storage devices used in hybrid electric vehicles if the energy is released via a direct mechanical path. The challenge with flywheels is how to control the amount of energy transferred. Flywheel systems may use Continuously Variable Transmissions (CVTs) to store and release energy. In the early days of flywheel vehicle development and even now in some industrial applications and Uninterruptible Power Supply (UPS) systems, energy is stored into and released from the flywheel via one or more motor/generator(s), traveling a 100 percent electromagnetic path from source to destination; these flywheel systems also suffer multiple energy conversions and limited efficiency due to conversion losses.

U.S. Pat. No. 7,341,534 by Schmidt discloses an electrically variable hybrid transmission and powertrain equipped with a flywheel energy storage device. In this configuration, based on modifying a conventional Internal Combustion Engine (ICE) driveline, the engine is coupled to the final drive through a torque converter, an automatic transmission, and the transmission shaft. The final drive may include a drive shaft, a differential, a set of fixed gears, and wheels, but does not include a transmission. Meanwhile, the flywheel is coupled to the final drive through a three way power split transmission wherein a first input/output port is coupled to the flywheel, a second is coupled to a motor/generator, and the third is coupled to the transmission output shaft. The motor/generator and the gears comprise a CVT between the flywheel and the transmission output shaft so that part of the energy recovered by the flywheel from the wheels is transferred through a purely mechanical path. The placement of the flywheel and its CVT is after the transmission of the engine, so the variator motor/generator in the flywheel's CVT must operate over a wide range and needs two planetary gear sets to perform the right function. Also, two transmissions are required; an automatic transmission for the engine and the three port power split CVT for the flywheel.

Document US2010/0184549 by Sartre, et. al discloses a similar configuration for the same purpose of energy recovery. Unlike Schmidt, the flywheel energy recovery system for Sartre is located between the engine and the engine's transmission. It takes advantage of the engine's transmission so that the energy recovery system is more independent from the vehicle speed than that in U.S. Pat. No. 7,341,534. The variator motor/generator for the flywheel operates over a narrower range than in Schmidt.

In both the configurations of Schmidt and Sartre, the CVT for the flywheel is a three way power split transmission embodied by planetary gears and at least one motor/generator to vary the CVT ratio for the aforementioned power split transmission. Both use three-port power split devices as transmissions only for the flywheel, so the engine needs a separate transmission. Another disadvantage is that both systems may have critical points where the variator motor/generator approaches zero speed (stall state, maximum current) and the system has poor efficiency unless the effect is mitigated through other means such as by mechanically braking the variator port when the motor/generator approaches zero speed.

Both the configurations of Schmidt and Sartre have coupled the engine and the final drive on the same port of the power split transmission. With the engine and the final drive both connected to the same port on the power split transmission, another transmission may be needed between the engine and the final drive to vary the relative speeds of the engine and the final drive. In these configurations, the CVT only serves the flywheel, so the engine needs its own separate transmission.

SUMMARY OF THE INVENTION

The conventional power split CVTs used in conjunction with a flywheel have three input/output ports, and may include an additional planetary gear set for gear reduction rather than as part of the CVT. In other words, the conventional three-port CVT is for use with only the flywheel, and a separate transmission is needed for the engine.

In the present invention, a number of kinetic hybrid systems and methods are demonstrated. Three-port power split CVTs and four-port compound power split CVTs that do not require a separate engine transmission are used in configurations and methods distinct from the prior art. A power split transmission may be a transmission that includes at least two paths that power can travel through. A compound power split transmission may be a power split transmission where the inputs can be split and the outputs can be split.

One thing is common to all the embodiments of the present invention: the final drive is connected to its own independent port and does not share its port with any other power source. The various power sources (flywheel, motor, and/or engine) may share the remaining ports in one way or another. In contrast, the conventional power split CVT's connect the engine and the final drive to the same port through an additional transmission. For embodiments using a three-port power split CVT, the present invention connects and uses the three-port power split CVT in ways that are distinct from the conventional system and methods.

In preferred embodiments of the present invention, one port manipulated by a variator can change the speed ratio between the other two ports. This allows the flywheel of the present invention to exchange energy with the vehicle, and it can also change the speed ratio between the engine and the final drive, allowing the engine to effectively transfer power to the vehicle's wheels across a full range of vehicle speeds.

In one aspect, a flywheel hybridizes a single motor electric vehicle. The flywheel (the kinetic power source), the motor (the variator and electric power source), and the final drive each have their own independent input/output port.

In another aspect, a flywheel hybridizes a dual motor electric vehicle. One motor, as variator, is connected to a first port, the final drive is connected to a second port, and the other motor serving as the electric power source and the flywheel serving as the kinetic power source and energy storage share the third port.

In further aspects, a conventional vehicle with an IC engine is hybridized into a kinetic-gas hybrid system. The variator and the final drive each has its own independent port while the flywheel and engine can share the third port and use the same transmission simultaneously, or connect to the three-port CVT through clutches, using the CVT in turns.

A four-port compound split transmission, as used in the present invention, ensures that there are enough independent ports for the engine, the final drive, the flywheel and the variator motor/generator to be separately coupled. The compound split CVT can be considered as comprised of two CVTs, one for the engine and the other for the flywheel. No other transmission is needed. It should be noted that the compound split CVT of the preferred embodiments of this invention is not equivalent to two separate CVTs that do not have direct feedback.

In a further aspect, the invention consists of a flywheel, an electrically controlled continuously variable transmission with preferably four ports for input/output, a prime mover, a control unit, and a plurality of gears working together to provide the vehicle with a powertrain, an additional power source, energy storage, and an energy recovery system. The prime mover used with the invention may be either an internal combustion engine or a motor/generator. The prime mover, the flywheel, the CVT variator, and the final drive are coupled to separate ports, allowing the CVT to be used for both the prime mover and the flywheel. As a kinetic energy storage device, the flywheel stores energy in the same form it is used in. When provided a direct mechanical path by the CVT for transfer of energy between the flywheel and the vehicle, the flywheel can recover the vehicle's kinetic energy during deceleration as well as directly power the drivetrain to drive the vehicle during acceleration or cruise, all with minimal energy conversion and conversion losses because of the direct mechanical transfer of energy. Using the flywheel as a secondary mover can also result in higher performance since flywheels have a much higher power density than motors or batteries. In an embodiment where the prime mover is a traction motor, an engine may be coupled to the same port to extend the vehicle's range. In an embodiment where the prime mover is an internal combustion engine, a torque motor/generator may share the same port to improve efficiency.

In yet another aspect of the invention, a "de-inertia operation" method is provided for controlling the flywheel with the powertrain so that the vehicle's inertial effects are drastically reduced. The flywheel can be precharged so that when the vehicle's kinetic energy is low, the flywheel is at its maximum energy level. The flywheel provides most of the power used to launch the vehicle from rest, starts the engine, and continues to participate in accelerating the vehicle, thus helping the vehicle overcome its rest inertia. When deceleration is desired, the energy in the flywheel may be at a relatively low level, and the flywheel can be charged back up to a higher energy level using the vehicle's kinetic energy. In doing so, the flywheel helps the vehicle to decelerate, helping reduce the effects of the vehicle's moving inertia. This method provides optimal efficiency and performance while the vehicle speed is changing, enabling downsizing of the engine and the motor/generators compared to conventional vehicles and hybrids. More specific steps to this method will be described later with reference to the drawings.

Still another aspect of the invention provides a method for controlling the powertrain to provide power to the vehicle during cruise with optimized efficiency. In conventional vehicles, when there is no need for acceleration, such as during cruise, the engine load is relatively low, and efficiency is low. The system of the present invention can raise the engine load and splits excess power generated from raising the load to the flywheel. The flywheel can be charged while the vehicle is in motion, and the engine is continuously run in its most efficient state (e.g. within a range of speeds and within a range of load that correspond to the engine's maximum efficiency). With the engine running at its optimal efficiency, its output is suitably divided between the flywheel and the vehicle. When the energy in the flywheel reaches a certain level, the engine is turned off and decoupled from the rest of the powertrain; the vehicle is then driven by the flywheel until the energy in the flywheel reaches a lower level or setting. At that point, the engine is coupled to the powertrain again to charge the flywheel. This method of alternatively using the engine to simultaneously charge the flywheel and drive the vehicle, and then decoupling the engine to let the flywheel drive the vehicle, allows for the engine to be run in a start-stop manner. Although electric hybrids may also operate the engine in a start-stop manner, it is often not practical for them to do so because of multiple stage energy conversion losses. Since the system of the present invention minimizes conversion losses, it may operate the engine this way more often.

Whenever the engine is on, it is run in its highest efficiency state with a fixed speed and preferably a fixed load, which can be adjusted or shared by the optional but beneficial torque motor/generator on the same port. Whenever the flywheel is driving the vehicle, the engine is off, and the vehicle consumes no fuel. The speeder motor/generator, or the variator, ensures that a constant power is delivered to the wheels so that the vehicle remains in cruise, regardless of whether it is driven by the engine or the flywheel. Hence, this method optimizes efficiency during cruise. Variations for a vehicle powered by a traction motor as the prime mover are also provided.

An additional aspect of the invention provides a motorless configuration, also capable of directing the storage and release of energy to and from a flywheel to benefit vehicle propulsion. Instead of using motors or a more complicated mechanical transmission, this configuration uses just planetary gearing and either a set of brakes or a slip clutch and a brake as variators.

BRIEF DESCRIPTION OF THE DRAWINGS

FIG. 2 shows an embodiment of the present invention for an electric vehicle;

FIG. 3 depicts various vehicle operation states for effective use of the embodiment illustrated in FIG. 2;

FIG. 5 shows a dual motor embodiment of the invention for an electric vehicle;

FIG. 6 depicts various operation states associated with the dual motor embodiment of FIG. 5 for an electric vehicle;

FIG. 8 shows an embodiment of the present invention for a vehicle having an engine as its prime mover, wherein the engine and the flywheel share in turn a three-port power split device as an electrically continuously variable transmission;

FIG. 9 demonstrates in more detail how the "share-in-turn" configuration of FIG. 8 can be controlled;

FIG. 11 shows various operation states over a range of vehicle demands for the equivalent embodiments of FIG. 10(a) and FIG. 10(b);

FIG. 13 illustrates the preferred embodiment of a hybrid powertrain with a flywheel and a four port compound split CVT;

FIG. 18 depicts various vehicle operation states that can be implemented to effectively use the preferred embodiment for both efficiency and performance over a range of vehicle demands;

FIGS. 20(a), 20(b), and 20(c) are flowcharts depicting stationary, reverse, and restore operations of a preferred embodiment;

DESCRIPTION OF THE PREFERRED EMBODIMENT(S)

Figure 1:
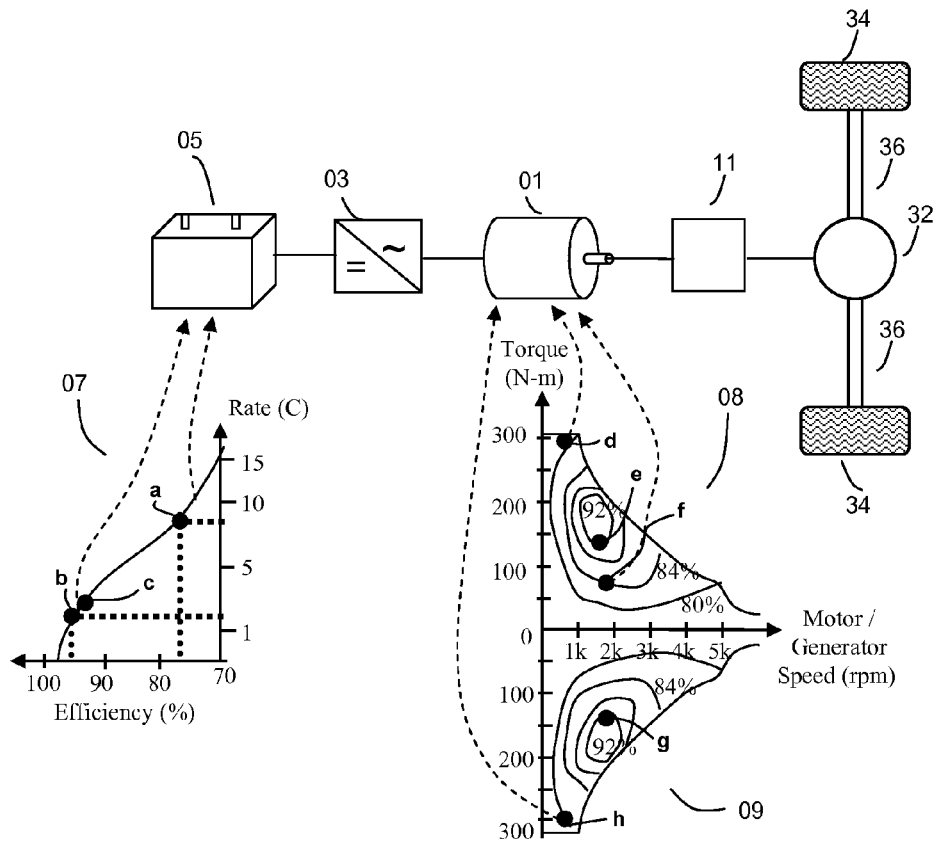
FIG. 1 illustrates some efficiency factors and calculations to point out some of the current limitations in the overall efficiency of an electric vehicle.

Embodiment(s) of the present invention are described herein with reference to the drawings. In the drawings, like reference numerals represent like elements.

Current Limitations of Electric Vehicle Propulsion Systems

Although both fuel efficiency and performance are desired in vehicles, they are conflicting goals in the design of a conventional vehicle powered by an internal combustion engine.

High performance vehicles are equipped with large engines but suffer from poor efficiency, whereas fuel efficient vehicles lack performance.

Gas-electric hybrid vehicle technologies have made considerable advances in resolving the deadlock conflict between fuel efficiency and accelerative performance. These hybrid electric vehicles, or HEVs, rely on a downsized engine that works at a better efficiency converting fuel to mechanical power, while a motor, as a secondary mover, supplements power to compensate for a smaller engine's lack of reserve power for acceleration. In addition, HEVs can recover part of the vehicle's kinetic energy with a generator during deceleration, which is typically wasted and completely dissipated as heat in the brakes when conventional vehicles are decelerated.

Yet there still remains a core problem in vehicle propulsion using electric power. Powering the vehicle with an electric machine requires an electrical energy storage (henceforth referred to as a battery pack, with the understanding that the "battery pack" can be any combination of different electrical energy storage devices, such as batteries and/or supercapacitors). The disadvantage to using an electric power source is that energy is not stored in the same form that it is used in. Even if each energy conversion can be performed at a high efficiency each stage, having multiple stages of energy conversion (such as in vehicle propulsion, where energy is converted from a mechanical form to an electric form and then to electrochemical form when energy from the engine or from regenerative braking is stored into the battery pack through a generator and inverter, then released and used to the vehicle's drivetrain, undergoing conversion from electrochemical to electric to mechanical form) results in considerable conversion losses. Conversion losses significantly limit fuel efficiency; this is a problem common to electric vehicles as well as to the electric system components of hybrid vehicles. Another problem frequently encountered by electric hybrid vehicles and by many electric vehicles is that the higher the rate of charge and discharge of power to and from the batteries, the less efficient the transformation of energy will be.

FIG. 1 illustrates the energy conversion efficiency rates for the batteries and motor/generator(s) of a typical electric vehicle under various conditions or vehicle operation demands. Such a vehicle is powered by a motor/generator 01 (which can also be known as an electric machine or a traction motor), which draws energy from the battery pack 05 through a controller/inverter 03; the output from the motor 01 is then transmitted to the final drive or gearbox 32 via the transmission 11; from the final drive 32, the output torque from the motor/generator 01 drives the vehicle's wheels 34 through the wheel axes 36. The element 07 of FIG. 1 refers to the inset curve representing the efficiency of the battery as it varies with the charge or discharge rate, C. C denotes a charge or discharge rate equal to the capacity of a battery in one hour, so for example, a battery pack that has 6.5 Ah capacity would charge or discharge at a rate of 6.5 A or 1 C with 96 percent efficiency but would charge or discharge at a rate of 65 A or 10 C with 73 percent efficiency. From the inset curve 07, it can be seen that efficiency is inversely proportional to the rate of charge or discharge. 08 and 09 are also inset curves. When the torque direction is in the same direction as motion, the motor/generator 01 is functioning as a motor, and its efficiency in this state as rotational speed and torque vary is depicted by inset curve 08, above the horizontal axis, where torque is positive. When the torque direction is opposite to the direction of motion, the motor/generator 01 is functioning as a generator, and its efficiency in this state as rotational speed and torque vary is depicted by inset curve 09, below the horizontal axis, where torque is negative. Overall electric system efficiency can be analyzed in the following cases.

Acceleration—accelerative vehicle demands include overcoming inertia and various resistive forces acting on the vehicle, and a large amount of accelerative power is desired. In order to provide such power, the battery pack 05 would typically be discharged at a relatively high rate, as shown by point a on the inset curve 07; conversion efficiency as the energy stored in electrochemical form is transformed into electricity is 77 percent as the inverter 03 supplies current to the motor 01. Because the motor 01 typically works at high torque and low RPM during acceleration, around point d on the inset curve 08, the combined efficiency of the inverter 03 and the motor 01 is around 80 percent. Overall efficiency is then 62 percent (0.77*0.80=0.62).

Steady speed (cruise)—during cruise, the vehicle need only overcome air drag and rolling resistance, as the kinetic energy of the vehicle need not change. Thus the demand on electrical current is low and the motor 01 would work at moderate speed and torque. The battery pack 05 can work near point b and achieve 96 percent efficiency, while the motor 01 and inverter 03 can work around point f and reach 84 percent efficiency. Overall efficiency is then 81 percent (0.96*0.84=0.81).

Regenerative braking—when the vehicle needs to be decelerated, the power demand on the motor 01 and the battery pack 05 is usually greater than acceleration power demands. For simplicity, however, assuming that the charge rate of the battery pack 05 and torque demands of the motor/generator 01 are symmetrical to the case for acceleration, the battery pack 05 works again around point a, and the motor/generator 01 would work near point h. In regenerative braking, kinetic energy from the vehicle's wheels 34 is transmitted through the wheel axes 36 and the final drive 32 to the transmission 11 and the generator 01 to be converted into electricity. From the generator 01, the electricity is passed to the inverter 03 and the battery pack 05, where electricity is transformed into a chemical form and stored. In the next acceleration maneuver, this energy conversion process is reversed, and the chemical energy in the battery pack 05 must be converted into an electrical form and then a mechanical form before it can accelerate the wheels 34. The path energy recovered from deceleration must traverse to reach the wheels 34 again thus involves four energy transformations, and the resulting efficiency is 38 percent (0.80*0.77*0.77*0.80). If other mechanical transmission losses and the use of other means to slow down the vehicle are considered, then efficiency is even lower.

It should be noted that the highest efficiency does not occur where the motor/generator 01 or the battery pack 05 is most efficient, but where the multiplicative product of their efficiencies is maximum, as it is unlikely that the motor/generator 01 and the battery pack 05 will both operate at optimal efficiency simultaneously. For example, when the motor/generator 01 works close to its most efficient around point e or g, the battery pack 05 may be operating around point c, so that the overall system efficiency is 86 percent (0.94*0.91=0.86).

Thus it can be seen that in vehicles relying upon electric machines for propulsion, efficiency can fluctuate quite a bit. Especially in situations calling for acceleration or deceleration, the amount of energy lost to conversion is significantly, particularly when large currents are needed or produced. Another factor to consider is that battery lifespan is inversely proportional to the number of charge/discharge cycles and the "depth" to these cycles. Reducing the rates of charge and discharge also prolongs battery life. In summary, to improve efficiency in electric systems for vehicle propulsion, it is important to use the motor/generator 01 and the battery pack 05 under conditions resulting in high efficiency, and it is important to avoid converting energy to be stored into the battery pack as much as possible, by reducing the rate (electric current) and the number of cycles of charge and discharge in the battery pack.

The Characteristics and Advantages of the Flywheel as a Mechanical Storage and Mechanical Power Source When it comes to vehicle propulsion, there is a fundamental truth: the ultimate form of energy the vehicle gains and uses is mechanical, and to be more specific, kinetic. If a kinetic power source and energy storage replace electric machines and electrical storage as a secondary power source or the secondary mover, then the vehicle would become a kinetic-gas hybrid. Furthermore, if the primary mover is not an internal combustion engine but an electric system, then the resulting combination of a kinetic secondary mover with an electric prime mover produces a kinetic-electric hybrid. (Note that the definition of hybrid used here refers to any vehicle having two or more sources of power for propulsion. There is a prime mover or primary power source, and a secondary mover or secondary power source, along with an energy storage that is used by the secondary power source; the energy supplied to the secondary power source generally comes from the prime mover, or from recovering the kinetic energy of the vehicle.) With a kinetic power source, the vehicle may directly use the stored energy without need for energy conversion, at least in a portion of the stored energy, or a majority of the stored energy, to move the vehicle, improving overall efficiency. (100 percent of the energy the vehicle uses from electric power sources must undergo conversion.)

Flywheels make for both a kinetic energy storage and a kinetic power source; a flywheel is analogous in function to both a battery pack (energy storage) and a motor/generator (power source and a means for recovering energy) combined into one device. A major benefit of a flywheel is that the form of the energy stored is kinetic, which is the same form that the vehicle needs to use. Hence there are no energy conversion losses, only energy transmission losses. This characteristic provides the basis for improving fuel economy.

Another important characteristic of the flywheel is its extremely high power density, easily over ten times the power density of electric machines for vehicle propulsion. As flywheels can output or absorb large rates of power while still remaining lightweight, they can vastly improve the vehicle's performance Flywheels have considerable energy density as well, which is an often neglected fact. Some flywheels may have more energy stored per unit weight than any type of battery. Unlike batteries, flywheels do not suffer degradation from use, and can easily outlast vehicle lifetimes. They do not create hazardous byproducts or wastes either in the manufacturing process or disposal. Flywheels also have a simple, cost-effective structure; they are simply a solid mass of material in a simple shape.

Owing to the aforementioned advantages, effective use of flywheels for vehicle propulsion may increase efficiency, reduce emissions, improve the vehicle's performance, and reduce cost of manufacture compared to electric hybrids comparable in power and size. The challenge is in how to utilize a flywheel just so to make the best use of the flywheel's characteristics for vehicle propulsion.

Basic Configuration of a Kinetic-Electric Hybrid System, with Methods

FIG. 2 shows a configuration for a vehicle with both a traction motor 01 and a flywheel 10 as power sources. With the traction motor 01 as the prime mover, this embodiment adds the flywheel 10 as a secondary power source and energy storage to an electric vehicle. Compared to the electric vehicle of FIG. 1, the embodiment features the flywheel 10, and the transmission 11 of FIG. 1 has been replaced by the planetary gear set 12. The planetary gear set 12 is a power split CVT with three input/output ports: the ring gear R, connected to the rotor of the motor/generator 01 as both the prime power source and as the variator; the sun gear S, connected to the flywheel 10 with a one-way clutch 24, which prevents the flywheel from spinning in the reverse direction; and the planetary carrier C, coupled to the final drive 32 (through an output shaft 33), which transmits power to the wheels 34. The energy for the motor/generator 01 is supplied by the battery pack 05 through the controller/inverter 03. There is also an interface 62, which connects to the vehicle's ECU 60 to gather relevant real-time data to help control this system. A variator may be a mechanism or device that can change its parameters, or parameters for other devices. For example, in an embodiment, a variator may be a mechanism through which the speed ratio in the planetary gear sets can be altered to correspondingly adjust the overall continuously variable transmission ratio.

The transmission in FIG. 2 need not be a power split device actualized as a planetary gear set 12, but the power split device shown here has its advantages—it provides a transmission to both the motor/generator 01 and the flywheel 10 using an extremely simple and cost-effective design. Changing the speed and/or torque on any one of the three input/output ports changes the speed and/or torque of the other two ports. The planetary gear set 12 is the transmission for the motor/generator 01. Together, the planetary gear set 12 and the motor/generator 01 comprise the continuously variable transmission for the flywheel 10. Since the motor/generator 01 can manipulate the speed and torque on the ring gear R, the speed and the torque of the planetary carrier C and the sun gear S can be varied, enabling the exchange of kinetic energy between the flywheel 10 and the wheels 34. The relationship of the motion of the three input/output ports in a planetary gear set can be expressed in the following equation:

$$(k+1)\omega_c = k\omega_r + \omega_s \qquad (1)$$

Where $\omega_c$, $\omega_r$, and $\omega_s$ are respectively the speeds of the planetary carrier C, the ring gear R, and the sun gear S, and the constant k represents the physical gear ratio between the ring gear R and sun gear S.

Even with an appropriate physical embodiment, the hybrid system must have an appropriate method of control to increase fuel efficiency effectively using a flywheel. FIG. 3 depicts different operation states for controlling the vehicle from the beginning to the end of a journey. In FIG. 3, the components of the system and their connections are simplified. M or G denotes the motor/generator 01, W denotes the vehicle's wheels 34, F is the flywheel 10, and B is the battery pack 05. For convenience, the final drive 32 has been omitted from FIGS. 3(a) through 3(i), and it is assumed that the speed of the planetary carrier C is proportional or equal to the speed of the wheels W. In the rotational diagrams representing the planetary gear set 12 and its ports, the thick filled arrows represent motion direction, and the thick unfilled arrows represent torque direction. In the component representations, a broken line signifies that for those components there is temporarily no connection or interaction. A solid line with an arrow indicates direction of energy flow or transfer. A solid line without an arrow means that the component connected to the planetary gear set is inactive, and there is also no energy transfer into or out of that component.

At the start of the drive or when stopped at an intersection, the hybrid system can pre-charge the flywheel F, as shown in FIG. 3(a). From equation (1), we can determine that when the vehicle is braked and the wheels W and $\omega_c=0$, $\omega_s=-k\omega_r$. It is assumed that the forward direction of motion in the vehicle's wheels W is clockwise in the planetary gear set 12 for the non-limiting examples of FIG. 3. As long as the motor M rotates the ring gear R in the counterclockwise direction (CCW) by some $\omega_r$, the flywheel F will spin in the clockwise (CW) direction at $\omega_s=-k\omega_r$. In a non-limiting example, when the physical gear ratio k between R and S is 4, when the speed of M reaches 2500 RPM, F will reach 10000 RPM. It should be noted that in the rotational diagram of FIG. 3(a) the gear turning in the CCW direction between the sun gear and the ring gear represents planetary pinion gears, which do not indicate the motion of the planetary carrier port but serve as a direct mechanical path for the power transfer between the ring gear port of the ring gear R and the sun gear port of the sun gear S. Hence, according to the operation state depicted in FIG. 3(a), the motor M can operate at a suitably low current so that the combined efficiency of the motor M and the battery pack B is optimal during this phase of pre-charging the flywheel F.

FIG. 3(b) shows that once the flywheel F is charged and acceleration is desired, the vehicle's brakes are released, and the motor/generator G reverses the direction of its torque to act as a generator, reducing the speed of the ring gear R by providing a braking torque in the direction opposite that of motion. The sun gear S obtains a reaction torque from the ring gear R, allowing for the release of energy from the flywheel F. Energy from the flywheel F is split into two paths: the majority of the power flows from S to C to accelerate the vehicle's wheels W, while a small portion is used by the generator G to produce the braking torque on R, which also charges the battery pack B in the process. In this operation state for acceleration the speeds of the flywheel F and the generator G, as well as the sun gear port of the sun gear S and the ring gear port of the ring gear R they are connected to, decrease, while the speeds of the planetary carrier port and the wheels W increase. Aside from the small portion of power supplied to the speed ratio variator G, the transfer of accelerative power from the flywheel F to the wheels W is extremely efficient, and the driveability of the vehicle at low speeds is improved by supplying accelerative power from the flywheel F, which has very high power density.

The first acceleration state portrayed in FIG. 3(b) only works until the speed of the ring gear R drops to zero, which happens when very large amounts of accelerative power is needed, such as at very high vehicle speeds. When this is the case, then the system may be operated in the second acceleration state, as shown in FIG. 3(c). By the time $\omega_r$ reaches zero, $\omega_c$ and the speed of the wheels W will have reached 1/(k+1) the flywheel F's speed, $\omega_s$. The motor/generator M then incrementally increases the speed of R in the same direction, acting as a motor now instead of a generator. At this point the power received by the wheels W is the sum of the power of the motor M and the power of the flywheel F. Typically with a power split device, the motor/generator (either M or G) uses less than one-third the total power to control over two-thirds of the total power in the flywheel F.

It should be mentioned that the acceleration at the start of a journey or drive can also occur without a flywheel pre-charge phase. In that scenario, although the forward or CW motion of the motor/generator M (causing the ring gear R to also rotate CW) would otherwise cause the sun gear S and flywheel F to spin in the reverse or CCW direction, the one-way clutch 24 locks down this port so that $\omega_s=0$. The planetary gear set 12 then becomes a fixed ratio transmission with (k+1)/k as the transmission ratio. To accelerate the vehicle without pre-charging the flywheel F would therefore involve the motor M working alone at a larger current and torque (lower efficiency and also lower performance, since the power density of motor/generators are lower, compared to operation states 3(a) through 3(c). If the flywheel F is not pre-charged as in 3(a), then it must wait for the next deceleration maneuver to be charged and be of use in the subsequent acceleration maneuver.

FIG. 3(d) depicts the cruise operation state. In the latter part of acceleration or during cruise, the energy of the flywheel F will eventually be released to zero. By then, the motor M will have already started rotating CW to provide power directly to the wheels W, no longer serving as the variator for the flywheel F. After $\omega_s$ reaches zero, the one-way clutch 24 locks the flywheel F and the port S, preventing them from spinning in the reverse direction, so $\omega_r$ remains at zero. The motor M alone provides power to the wheels W, but since during cruise the vehicle only has to overcome air drag and rolling resistance, the power required to maintain cruise is not high, and the motor M by itself can drive the vehicle with a relatively high system efficiency (the combined efficiency of the battery pack B and the motor M).

If the flow of energy from the battery pack B to the motor/generator M/G is stopped, the rotor of the motor/generator M/G and the ring gear R it is connected to can spin freely without transmitting torque. Thus both the vehicle's wheels W and the flywheel F can remain in the same state, and do not affect one another (as there is no torque on the ring gear R). This is equivalent to a neutral state, seen in FIG. 3(e). If the vehicle was in motion, it will remain in motion, which is considered coasting. If the vehicle was stopped, it will remain stopped.

During deceleration, if the speed of the flywheel F is less than k+1 times the vehicle speed (also expressed as $\omega_s<(k+1)\omega_c$) then the motor/generator G acts as a generator, applying a torque in the CCW direction opposite the CW direction of motion, reducing the speed $\omega_r$ of the ring gear R, depicted in FIG. 3(f). The reaction torque produced and the decrease in $\omega_r$ have the effect of reducing the speed of the carrier port and the wheels W, and accelerating the sun gear S and the flywheel F in the forward (CW) direction. The portion of the vehicle's kinetic energy that becomes stored in the flywheel F is transferred via a direct mechanical path from the planetary carrier C to the sun gear S at very high efficiency. The portion of energy required by the variator G to produce the torque directing the transfer of the vehicle's kinetic energy into the flywheel F travels an electromagnetic path and becomes regenerated as electricity and stored into the battery pack B.

The second deceleration state, shown in FIG. 3(g), occurs when the flywheel F has accrued enough energy so that its speed is greater than k+1 times the vehicle speed, which can be expressed as $\omega_s>(k+1)\omega_c$. The motor/generator M becomes a motor to push the ring gear R to spin in the CCW direction to enable the flywheel F to spin more quickly and store more energy than is otherwise possible. This second deceleration state continues until the vehicle speed, or $\omega_c$, is zero. Of the total energy stored into the flywheel F, a portion comes from the vehicle's kinetic energy, and a portion comes from the motor M.

To drive in reverse, the operation state depicted in FIG. 3(h) is used. The motor M rotates in reverse, causing the wheels W to turn in the reverse direction, and charging the flywheel F.

At the end of the drive, it may be desirable to transfer the energy in the flywheel F to the battery pack B. To do so, the planetary carrier C is mechanically braked so that $\omega_c=0$, and the generator G regenerates the energy from the flywheel F as electricity to the battery pack B at a small current and at a high system efficiency.

As a variation, the kinetic-electric hybrid system described in FIG. 2 may be placed in an existing vehicle. In a non-limiting example, the configuration of FIG. 2 may be placed at the rear wheels 34 of a front wheel drive vehicle powered by an IC engine 20, forming a kinetic-gas-electric hybrid vehicle seen in FIG. 4(a).

Figure 4A:
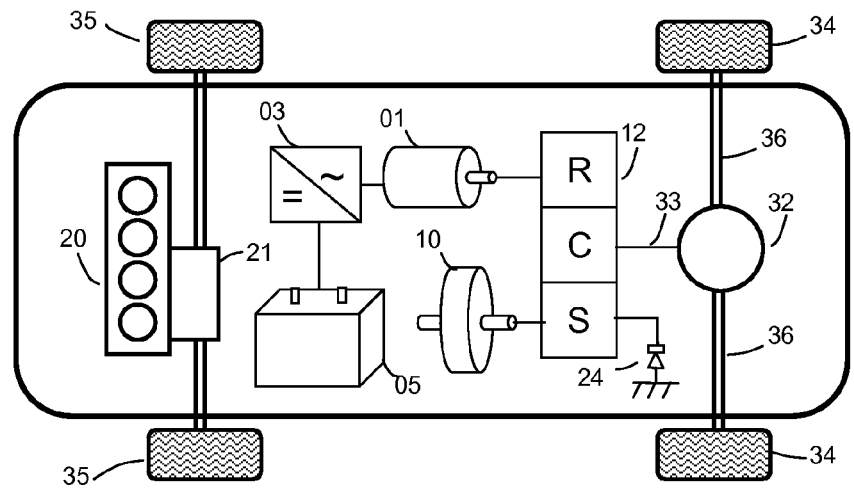
FIG. 4(a) illustrates one possible way of combining the embodiment of FIG. 2 into an existing vehicle.
Figure 4B:
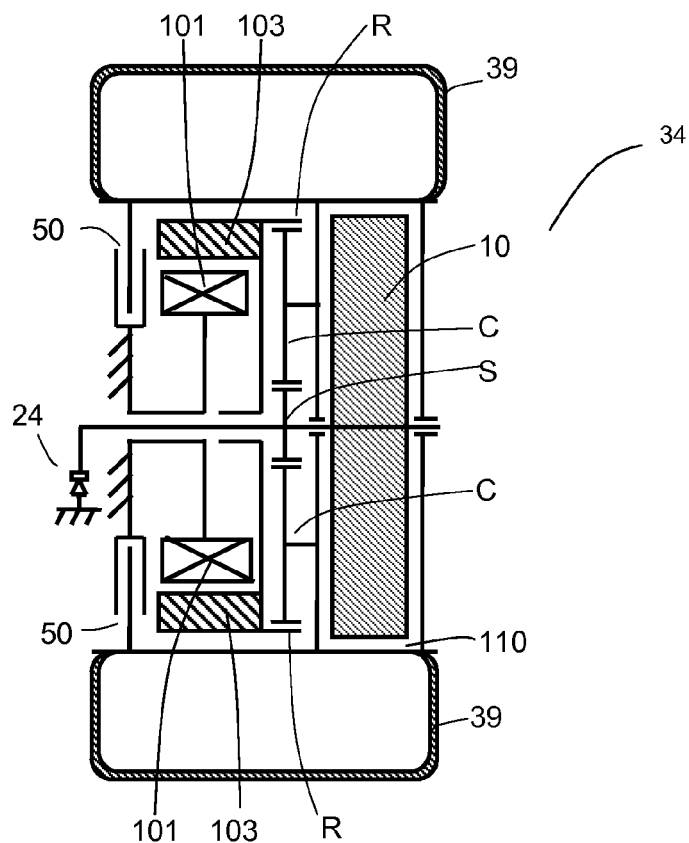
FIG. 4(b) illustrates a wheel hub implementation of the system described in FIG. 2 as a mechanical schematic.

FIG. 4(b) illustrates another implementation where the basic kinetic-electric hybrid configuration of FIG. 2 is inside a wheel hub. S is the sun gear, C is the planetary carrier gear connected to the wheel hub, and R is the ring gear of the planetary set 12; the flywheel 10 is connected to the sun gear S in the housing 110. The one-way clutch 24 which prevents the flywheel from spinning in reverse is connected to the sun gear S. There is also a motor/generator stator 101, which is fixed to the chassis, and a motor/generator rotor 103, which is connected to the ring gear R. The mechanical brakes 50 of the wheel 34 are drawn, as is the tire 39. This implementation is ideal for modifying or upgrading an existing wheeled vehicle to a hybrid, since it features the advantages of convenience, space conservation, and cost-effectiveness in addition to increasing fuel efficiency and providing more accelerative power.

Dual Motor Kinetic-Electric Hybrid System and Methods

There is room for improvement for the basic hybrid system configuration. FIG. 5 demonstrates a kinetic-electric hybrid system using two motor/generators, 01 and 02. The major difference in this configuration compared to FIG. 2 is the addition of the motor/generator 02 on the sun gear S of the planetary gear set 12 along with the controller/inverter 04 for the motor/generator 02. There is also the addition of a DC bus 06, which supplies both the controller/inverters 03 and 04 with current from the battery pack 05. The physical gear ratio of the ring gear R to the sun gear S, k, is reduced compared to the single motor configuration. With a smaller value of k, the difference in speeds between the motor/generator 01 and the motor/generator 02 is less likely to be so great that it affects efficiency. Everything else remains the same as the basic configuration of FIG. 2, except that the flywheel 10 now needs a gear set 17 to increase the speed. The additional motor/generator 02 and controller/inverter 04 may increase cost, but is well worth it in the end, as both efficiency and ease of control are improved. Further details regarding the configuration are explained in FIG. 6, which reveals various ways the system may be used.

To pre-charge the flywheel F, the dual motor configuration of FIG. 6(a) can use one of the motors M1 and M2, or both. M1 would need to rotate in the CCW direction and/or M2 would rotate in the CW direction to spin the flywheel F CW. Efficiency should be the primary factor in determining whether one or both of the motor/generators is used in the pre-charge phase.

For acceleration, illustrated in FIG. 6(b), the variator G1 produces a torque in the direction opposite the motion of the ring gear R. The resulting reaction torque transfers power from the flywheel F to the wheels W. This is the same process compared to the first acceleration state in the basic single motor configuration, with the distinction that the electricity generated by the variator G1 is used by the motor M2 to spin the sun gear S in the same direction as the flywheel F, instead of charging the battery pack B. Thus the vehicle is propelled by both the motor M2 and the flywheel F on the sun gear S.

There are three advantages to this change. Firstly, efficiency is increased, since the electricity generated by the variator G1 is spared two stages of conversion (electric to chemical, chemical to electric) and the conversion losses associated. This, in turn, prolongs the life of the battery pack B, since battery life is inversely proportional to the number of charge/discharge cycles. Also, by adding the power of M2 to vehicle propulsion, performance is improved.

By the time the ring gear R is turning CW, the variator M1 is no longer functioning as a generator, but as a motor; this marks the second acceleration state, which can be seen in FIG. 6(c). The motors M1 and M2, as well as the flywheel F, all propel the vehicle, which is accelerated with the combined torque of all three power sources.

The neutral or coasting state shown in FIG. 6(d) is achieved when electricity is neither supplied to nor generated from the motor/generators M1 and M2. When M1 and M2 are off, there is no torque to transfer energy between the vehicle and the flywheel F, and the rotors of the motors M1 and M2, connected to ports R and S, spin freely.

During cruise, the dual motor configuration seen in FIG. 6(e) offers a little more flexibility compared to the single motor configuration illustrated in FIG. 2. The power that the vehicle needs during cruise is very little, and especially at lower speeds the motor may not be able to operate at optimal efficiency. Increasing the load of a motor may increase efficiency. Hence, in a dual motor configuration, the motor M2 may charge the flywheel F while simultaneously driving the vehicle in cruise, raising efficiency. The variator G1 can also maintain the transmission speed ratio at an optimal efficiency, so that both motor/generators G1 and M2 as well as the battery pack B may operate near points c, e, and g in FIG. 1.

In the second cruise state depicted in FIG. 6(f), the flywheel F has accrued enough energy that it is now desired to release its energy. The variator G1 continues to control the vehicle speed by adjusting the transmission speed ratio. The motor M2, however, transitions to another operation state where it only uses the electricity generated by G1 and none from the battery pack B. When cruising at a low vehicle speed, the first and second cruise states may be used in turn to improve efficiency. Also, the kinetic energy can be reserved at a certain level for possible acceleration demand. At a higher speed, however, a third cruise operation state may be desired.

The third cruise state illustrated in FIG. 6(g) may be naturally reached from the first cruise state. When the vehicle speed and the system efficiency are not too low, then an equilibrium will be reached, wherein the motor M2 outputs just enough power to maintain the current vehicle speed, and there is a balance between the speed of the flywheel F and the vehicle speed, so that there is no transfer of energy into or out of the flywheel F, which merely serves to stabilize the vehicle speed.

A fourth cruise state shown in FIG. 6(h) may be used in situations where the energy stored in the flywheel F exceeds the amount desired for reserve power use. The motor M2 is electrically off so that only the variator G1 is in operation to release energy from the flywheel F; additionally, even if the energy in the flywheel F is completed depleted, the one-way clutch mechanism 24 can lock the sun gear S so that the flywheel F does not affect the drivability of the vehicle when the motor/generator G1 takes over to propel the vehicle by itself as a motor. Which of these four cruise states is best for efficiency depends on many conditions and may be determined in real-time by the vehicle's ECU 62, which can generate signals needed to control the hybrid system.

The deceleration states are basically the same as the deceleration states of the basic single motor configuration in FIG.

3(f) and FIG. 3(g). For the first deceleration state, shown in FIG. 6(i), the variator G1 produces a braking torque on the ring gear R, which is initially turning in the same direction as the planetary carrier C and the vehicle's wheels W. The braking torque slows the ring gear R and the planetary carrier C, but it also speed up the sun gear S and the flywheel F, thereby passing the vehicle's kinetic energy to the flywheel F through a mechanical path without conversion; the motor M2 is electrically off, so it produces no torque, and its rotor spins at the same speed as the flywheel F. The ring gear R will at some point be completely braked by the torque produced by the variator G1, and will start to turn in the opposite direction as the planetary carrier C and the wheels W. This marks the beginning of the second deceleration phase, illustrated in FIG. 6(j), where the variator M1 works as a motor to further increase the speed of the ring gear port in the reverse direction and force more energy into the flywheel F, until the vehicle speed and the speed of the planetary carrier port drops to zero.

When it is desired to drive the vehicle in reverse, the motor M1 turns the planetary carrier port in the reverse direction while the generator G2 acts as a variator so that energy is passed from the ring gear port to the planetary carrier port, shown in FIG. 6(k). This induces the planetary carrier port and the wheels W to turn in the reverse direction also.

FIG. 6(m) demonstrates how energy may be restored from the flywheel F to the battery pack B. The motor/generator G2 simply works as a generator, absorbing the energy from the flywheel F and regenerating it as electricity to store into the battery pack B while the motor/generator G1 is off. Since there is no torque on R, there is no influence to the wheels W. Thus flywheel energy restoration may be performed when the vehicle is moving (coasting) as well as when the vehicle is stopped.

Figure 7A:
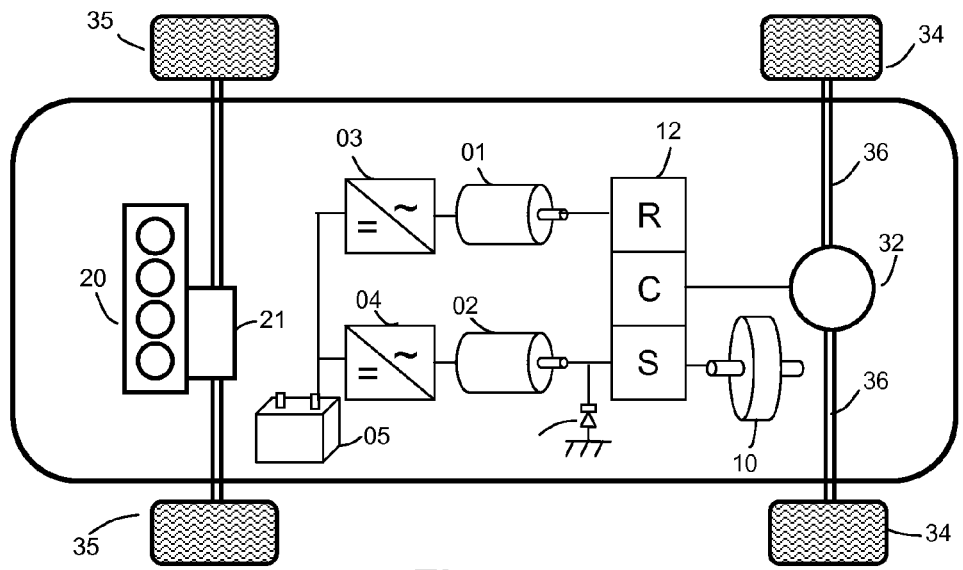
FIG. 7(a) shows a possible way of placing the dual motor embodiment into an existing vehicle with an engine to form a hybrid vehicle with three power sources.

In summary, the dual motor hybrid configuration demonstrated by FIGS. 5 and 6 offer more flexibility for control and higher performance while simultaneously improving efficiency by reusing electricity generated by the variator back into the powertrain instead of continually recharging the battery pack, which also extends the battery life. A powertrain in an automobile may be the collection of components that work as a system to generate and transmit power from a power source to the road surface (e.g., the engine, motor, flywheel, gears, transmission, and wheels). As shown in FIG. 7(a), the configuration of FIG. 5 can also be placed into a vehicle where, as a non-limiting example, an IC engine 20 is the prime mover driving the front wheels 35 through the transmission 21. The hybrid system can be connected to the final drive 32 at the rear of the vehicle and drive the rear wheels 34 through the axes 36. Thus an existing vehicle combined with the system of the present invention can be upgraded to a kinetic-gas-electric hybrid, similar to FIG. 4(a).

Figure 7B:
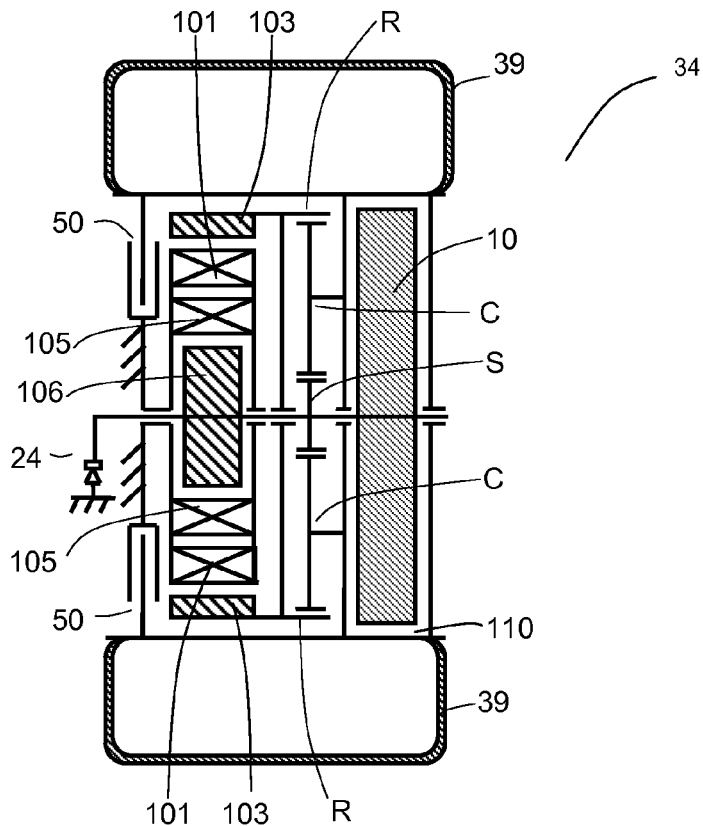
FIG. 7(b) illustrates a wheel hub implementation of the system described in FIG. 5 as a mechanical schematic.

Another implementation is illustrated in FIG. 7(b). Here, the motor/generators 01 and 02, the flywheel 10, and the planetary gear set 12 are all built into a wheel hub; besides better efficiency, this implementation basically has the same features and advantages, although the structure has now been modified to fit two motor/generators. The rotor 103 of motor/generator 01 is connected to the ring gear, and the rotor 106 of motor/generator 02 is connected to the sun gear S; both the stator 101 of the motor/generator 01 and the stator 105 of the motor/generator 02 are affixed to the wheel hub itself. In all other aspects, the structure of this wheel hub implementation is the same as the simpler wheel hub implementation of FIG. 4(b).

Three-Port Hybrid System Configuration with Flywheel and Engine on Separate Ports As seen in FIGS. 4(a), 7(a), it is possible to combine two independent powertrains to form what is similar to a four wheel drive hybrid. The power sources in these implementations each has its own independent transmission and can be operated separately or together. However, because of the separate transmissions, the implementations of 4(a) and 7(a) are somewhat complex. FIG. 8 shows a more integrated arrangement.

On the basis of the dual motor kinetic-electric hybrid system, the configuration of FIG. 8 introduces an IC engine 20 into the powertrain as the prime mover. Note that although there is now an additional power source, no additional transmission is required. The planetary gear set 12 remains at the core of the system, combing three different power sources—the IC engine 20 coupled to the ring gear R through a clutch 22, the flywheel 10 coupled to the sun gear S through clutch 16 and the gear set 17, and the motor/generators 01 and 02, respectively connected to R and S. The planetary carrier C is the input/output port connected to the output shaft 33 that transmits power to the final drive 32 and from there to the wheels 34 through the axes 36. The system interface 60 and ECU 62 generate signals to the controller/inverters 03 and 04, which in turn operate the motor/generators 01 and 02, respectively, to direct the power flow within the hybrid system.

When the clutch 22 is disengaged, decoupling the engine 20 from the drivetrain, while the clutch 16 is engaged, coupling the flywheel 10 to the drivetrain, the system is in the kinetic-electric mode seen in FIG. 5, wherein the planetary gear set 12 and the variator motor/generator 01 comprise the electrically variable CVT for the flywheel 10. The variator 01 can adjust the speed ratio of the CVT to control the transfer of energy between the vehicle's wheels 34, connected to port C, and the flywheel 10 on port S. The motor/generator 02 also serves as a mover, reusing the electricity generated from the variator 01 back to the powertrain so that the regenerated energy does not have to be stored in the battery pack 05, which increases efficiency and performance as well as prolonging battery life.

When the clutch 16 is disengaged, decoupling the flywheel 10 from the drivetrain, but the clutch 22 is engaged, the system is in the gas-electric hybrid mode. The planetary gear set 12 and the motor/generator 02 comprise an electrically variable CVT for the engine 20 controlling energy transfer between the ring gear port and the planetary carrier port. In this mode the variator 02 acts as a generator, and the motor 01 reuses the electricity from the variator 02 back to the powertrain to avoid conversion losses in the battery pack 05. The motor 01's power supplements that of the engine 20.

Disengaging both clutches 16 and 22 permits operation of a pure electric mode. Either motor/generator may act as a variator for the other in the CVT. Either one or both motors may be used for vehicle propulsion. At lower vehicle speeds the use of a single motor for propulsion may be more efficient, while at high vehicle speeds it may be more efficient to use two motors to share the load and improve efficiency. With 01 as the variator and 02 propelling the vehicle, the transmission speed ratio is greater than (k+1), suitable for low vehicle speeds; with 02 as the variator and 01 propelling the vehicle, the transmission speed ratio is greater than (k+1)/k, more suitable for moderate vehicle speeds; with both 01 and 02 acting as motors propelling the vehicle, the transmission speed ratio is adjustable and less than (k+1)/k, suitable for high vehicle speeds.

The methods used to control the system of FIG. 8 can be described along with the vehicle's operation states shown in FIG. 9. Since the engine E in FIGS. 9(a)-9(c) is disengaged throughout these three operation states, FIGS. 9(a)-9(c) are equivalent to FIGS. 6(a)-6(c). FIG. 9(d) depicts the system starting the engine E during acceleration. Since the ring gear R is already rotating in the forward direction from the second acceleration state in FIG. 9(c), the engine E can be started by engaging the clutch 22. Thus, both motor/generators M1 and M2, as well as the engine E and the flywheel F, contribute power to move the vehicle after the engine E starts. Should the energy in the flywheel F be depleted, the clutch 16 can be disengaged, decoupling the flywheel F from the drivetrain so it does not adversely affect drivability.

FIG. 9(e) depicts a first cruise state, wherein the flywheel F is disengaged, and the engine E provides the power that the vehicle needs while the variator G2 manipulates the speed ratio of the CVT to control vehicle speed. The motor M1 reuses the electricity generated by the variator G2 to also propel the vehicle, reducing the number of charge/discharge cycles for the battery pack B, extending battery life. In a second cruise state shown in FIG. 9(f), the motor/generator G1 acts as a generator to not only control the transmission's speed ratio, but also to generate electricity for the battery pack B and to increase the load of the engine E and thereby improve efficiency. Under a third cruise state, seen in FIG. 9(g), when the state of charge in the battery pack B is too high, the engine E is shut off and disengaged from the powertrain, and either one or both motor/generators M1 and/or M2 would be used to maintain the vehicle's cruise speed. At higher vehicle speeds, using both motor/generators would be preferred, since they can both split the load to operate at a better efficiency.

The deceleration states demonstrated by FIGS. 9(h), 9(i) also do not involve an active engine, so they are equivalent to the states depicted in FIGS. 6(i), 6(j). In FIG. 9(j), the engine E charges the battery pack B via the generator G1, while the flywheel is decoupled and the motor/generator M/G2 is off. Since the CVT is neutral, this battery charge state can be used regardless of whether the vehicle is moving or stopped. For the states of reverse (FIG. 9(k)) and flywheel restore (FIG. 9(m)), the process and the method for control are exactly the same as in FIGS. 6(k) and 6(m).

Gas-electric hybrids save fuel primarily by virtue of running a small engine in a fuel efficient region of operation. Although the downsized engine has low reserve power, performance is not compromised because the hybrid relies upon the electric power source and energy storage to compensate for the engine's poor performance. The electric power source and energy storage also enable regenerative braking to recover a portion of the vehicle's kinetic energy that is normally completely lost when a conventional vehicle is decelerated. As analyzed and discussed in FIG. 1, the same limitations exist and apply for electric hybrids and for pure electric vehicles. These vehicles face the challenges of efficiency, performance, and cost due to the fact that in acceleration and deceleration high power is needed to propel the vehicle and to regenerate or recover the vehicle's kinetic energy. Efficiency is limited because energy conversions are needed to use or store energy in the batteries. To have good performance, the vehicle would need a large traction motor, a large battery pack, and a high power controller/inverter, which increase cost of manufacture.

Power split gas-electric hybrid vehicle powertrains are well known, but if a flywheel is integrated into the powertrain, the vehicle becomes a kinetic-gas-electric hybrid like the one shown in FIG. 8. Using a flywheel as a kinetic energy storage and a power buffer can go a long way in overcoming the aforementioned challenges faced by electric propulsion systems. Flywheels store and release kinetic energy, which is the same form of energy the vehicle uses; with a power split CVT as in FIG. 8, the majority of the energy to and from the flywheel may be transferred via a direct mechanical path, with only 30 percent or so of the total power traveling an electric path. This represents a significant increase in system efficiency, as energy conversion losses are drastically reduced. Flywheels also increase performance, as they have high power density. The electric variator for the power split CVT should be rated for 30 percent of the total power used to propel the hybrid vehicle. Since the power demands on the electric propulsion system are reduced with the addition of a flywheel, the electric propulsion system components (motor/generator(s), inverter(s), and battery pack) can be considerably downsized, reducing cost. Having a flywheel to buffer energy and power instead of storing and releasing energy to the battery pack also has the advantage of reducing the number of charge/discharge cycles for the battery pack, which extends battery life.

Three-Port Hybrid System Configuration with Flywheel and Engine Sharing Same Port FIG. 8 illustrates a hybrid system with a three-port power split CVT where the prime mover IC engine 20 and the secondary mover flywheel 10 are on separate input/output ports of the power split CVT. In this arrangement, the flywheel 10 and engine 20 may not be able to use the CVT simultaneously. Hence, with the engine 20 controlling the CVT during cruise, the flywheel 10 may not be of use in the cruise state(s).

Another arrangement is possible while maintaining the principle of keeping the final drive 32 independent on its own input/output port in a three-port power split CVT. Placing a power plant on the same port as the final drive 32 may result in an additional transmission being needed for that power plant. Thus, the engine 20 and the flywheel 10 may either each command one of the remaining two ports, as with the configuration of FIG. 8, or share a common port, leaving the third port alone to a variator motor/generator 01, which can then control the transmission speed ratio for both the engine 20 and the flywheel 10, as in FIGS. 10(a) and 10(b).

Figure 10A:
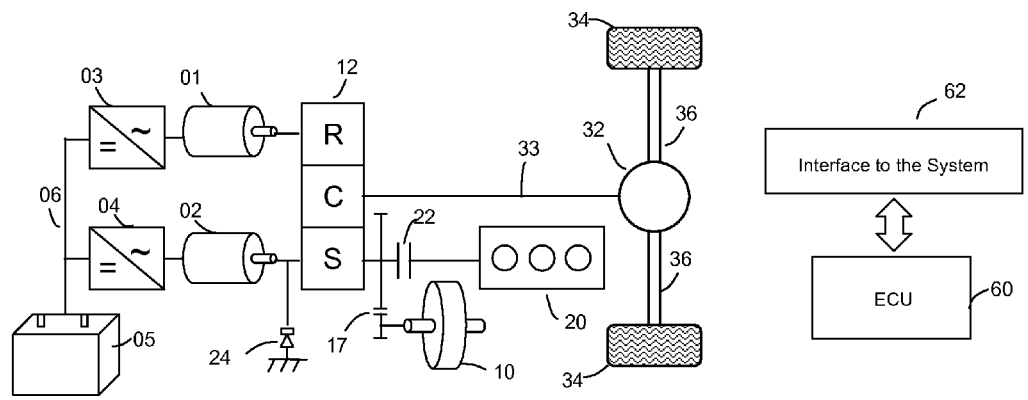
FIG. 10(a) presents an embodiment of the invention for a vehicle having an engine as its prime mover, wherein the engine shares a port of the CVT with the flywheel through a clutch.

For the configuration of FIG. 10(a), the IC engine 20 is connected to the sun gear port of the planetary gear set 12 through a clutch 22. Also connected to the sun gear port are the flywheel 10, connected through a gear set 17 which increases the speed of the flywheel 10 relative to the sun gear S, the motor/generator 02, and a single one-way clutch 24. The variator motor/generator 01, connected to the ring gear port of the ring gear R, controls the speed ratio between the sun gear port and the planetary carrier port of the planetary carrier C. The final drive 32 is connected to the planetary carrier port through a shaft 33, and drives the vehicle's wheels 34 by the axes 36. The motor 02 improves efficiency, both by reusing electricity generated from the variator 01 back into the powertrain to assist the flywheel 10 in propelling the vehicle, and by sharing the load of the engine 20 (also on port S) so that the engine's efficiency is improved. While the engine 20 and the motor 02 are operated within a suitable speed range good for fuel efficiency, the gear set 17 permits the flywheel 10 to be simultaneously charged to spin at a faster speed than the other power sources, increasing the amount of energy that can be stored into the flywheel 10.

Apart from propelling the vehicle, an important function of the engine 20 is to charge the flywheel 10, maintaining the flywheel 10's RPM within a certain range. The RPM range of the flywheel 10 can be controlled dynamically, for example, as a function of the current vehicle speed. The flywheel 10's speed can be inversely related to the vehicle speed, so that the sum of the vehicle's kinetic energy and the flywheel 10's kinetic energy at any given moment is approximately a constant value, which in one non-limiting example can be equal to the maximum safe energy storage capacity of the flywheel 10. Should the flywheel 10 drop below a lower speed or energy setting at any moment, the engine 20 may be engaged with the clutch 22 to charge the flywheel 10; when the flywheel 10 is above some higher speed or energy setting, the engine 20 may be disengaged and turned off. The engine 20 can be operated in a start-stop manner, either charging the flywheel 10 at the engine's maximum efficiency, or using no fuel when the engine 20 is disengaged and shut off. The flywheel 10 may be thought of as an energy buffer for the engine 20, gradually releasing the excess energy generated as a result of running the engine 20 in its most fuel efficient state. In comparison, HEVs may use the same control strategy at times with electric storage devices as buffers for the excess energy generated by the engine, resulting in more conversion losses and lower overall system efficiency.

Figure 10B:
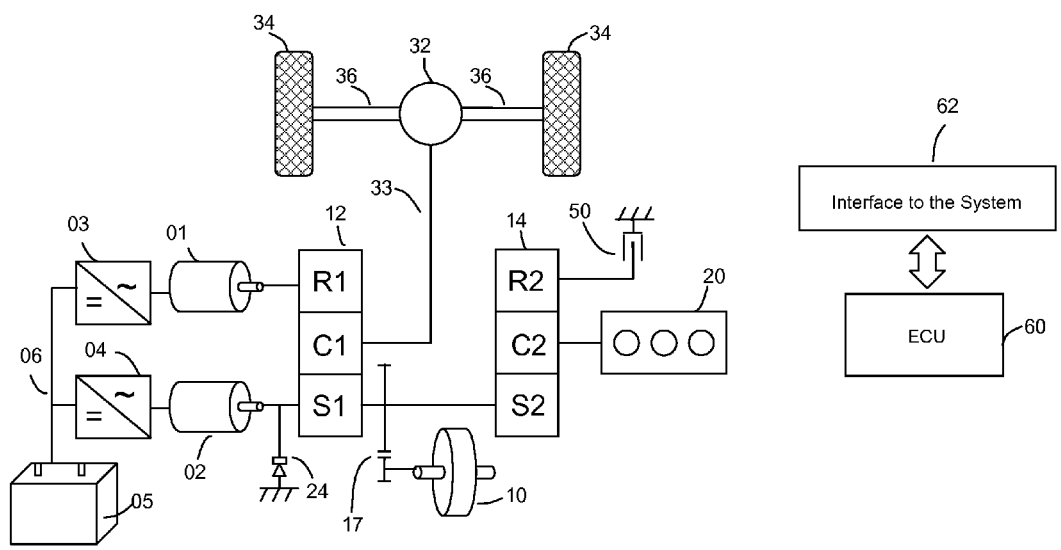
FIG. 10(b) presents a variation upon FIG. 10(a) where instead of clutches the embodiment features a second planetary gear set with a brake, enabling the selective coupling or decoupling of the engine from the system without needing slip clutches, making for a clutchless embodiment.

The configuration portrayed in FIG. 10(b) is a variation on the arrangement in 10(a). In 10(b), the slip clutch 22 connecting the engine 20 to the powertrain has been replaced by the planetary gear set 14 and the brake 50, which comprise a coupling/decoupling mechanism that is equivalent to the slip clutch 22. The sun gears S1 and S2 of planetary gear sets 12 and 14, respectively, are connected. The engine 20 is connected to the planetary carrier C2 of planetary gear set 14, and so when ring gear R2 of planetary gear set 14 is braked by 50 (equivalent to engaging the engine 20), the engine 20 can transmit power to the flywheel 10 and the planetary gear set or CVT 12. When the ring gear R2 is not braked (which is equivalent to disengaging the engine 20), the ring gear R2 is able to spin freely and the engine 20 can be turned off.

FIGS. 11(a)-11(m) provides more detail on how to control the equivalent embodiments of FIGS. 10(a) and 10(b).

When pre-charging the flywheel, illustrated in FIG. 11(a), the variator G1 is off, so the wheels W on the planetary carrier port are free to maintain their current speeds while the motor M2 charges the flywheel F. The flywheel F can be pre-charged in this way with the vehicle stopped (wheels W braked) or moving (wheels W at the same velocity as their velocity just prior to pre-charge). The engine E may be used to pre-charge the flywheel F if the state of charge in the battery pack B is low, or if doing so would be more efficient. To start the engine E with the flywheel F, all that has to be done is to engage the engine E after the flywheel F has accrued a certain level of energy, as shown in FIG. 11(b). When acceleration is desired, the variator G1 or M1 produces a torque in the same direction as the desired direction of motion for the wheels W, which produces a reaction torque from the ring gear port of the ring gear R that enables power from the sun gear port of the sun gear S to transfer to the planetary carrier port of the planetary carrier C. When acceleration first begins, the ring gear R that had been spinning freely in the reverse direction is braked by the torque from the variator G1, which acts as a generator in this first accelerative state of FIG. 11(c). Because the torque provided by the variator G1 or M1 does not change throughout the process of acceleration, the ring gear R will reach a point (if acceleration continues to very high vehicle speeds) when it is completely braked and its speed is zero, then start to rotate in the same direction as port C, which marks the start of the second accelerative state of FIG. 11(d). Then, since the torque direction is the same direction as motion of the ring gear port the ring gear R, the variator M1 is now acting as a motor, not as a generator. If the motor/generator G1 and M2 and the engine E are all inactive or disengaged, the vehicle is in a neutral and/or coasting state, shown in FIG. 11(e), and the speed of the flywheel F remains unchanged.

During cruise, the configurations of FIG. 10(a) and FIG. 10(b) are capable of using the flywheel F to buffer the energy produced by the engine E so that the engine E can always operate in its most efficient state, in a start-stop manner. In the first cruise state presented in FIG. 11(f), the engine E not only provides energy to the sun gear port of the sun gear S to accelerate the wheels W on the planetary carrier port of the planetary carrier C, but also charges the flywheel F. The engine E operates within a suitable speed range for fuel efficiency, and the variator G1 and motor M2 may adjust the engine load dynamically to ensure that the engine E runs at its best efficiency. Once the flywheel F's energy reaches a certain level or setting, the engine E can be disengaged and turned off, allowing the vehicle to be propelled primarily by power from the flywheel F, shown in FIG. 11(g). When the energy in the flywheel F drops below a certain level or setting, the engine E can be engaged again to simultaneously charge the flywheel F and drive the wheels W. The system alternates between the states of FIG. 11(f) and FIG. 11(g) to optimize the vehicle's efficiency for the entire duration of the cruise period.

The first and second deceleration states, presented in FIGS. 11(h) and 11(i), function in the same way as FIGS. 6(i) and 6(j), respectively, since the engine E is disengaged (not involved in deceleration). Similarly, the states of FIGS. 11(k) and 11(m), for driving the vehicle in reverse and for restoring the flywheel F's energy to electrical energy storage, are exactly the same as the states of FIGS. 6(k) and 6(m). At any point in the drive where the state of charge in the battery pack B is too low, however, energy from the engine E and/or the flywheel F can be used to charged the battery pack B through the generator G2 in the neutral battery charge state of FIG. 11(j). Since the variator G1 is off, there is no exchange between the sun gear port of the sun gear S and the planetary carrier port of the planetary carrier C, and the battery pack B may be charged regardless of whether the vehicle is stopped or moving.

Brake-Based, Motorless Kinetic Energy Recovery System, Embodiments and Methods

Figure 12A:
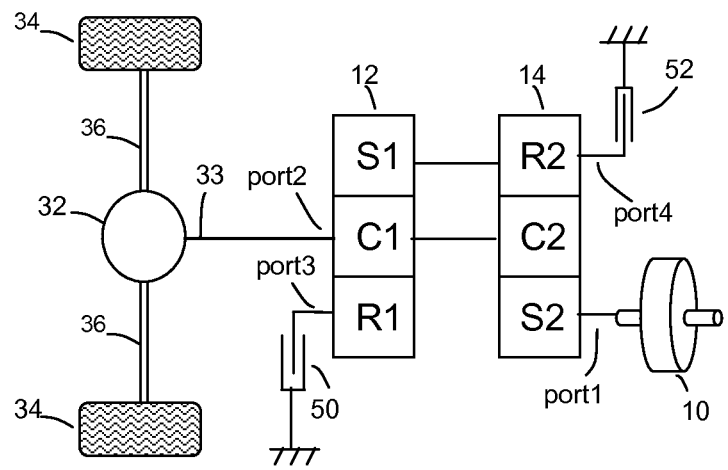
FIG. 12(a) illustrates a unique motorless embodiment of the present invention where a pair of brakes act as variators to store energy to and release energy from the flywheel.
Figure 12B:
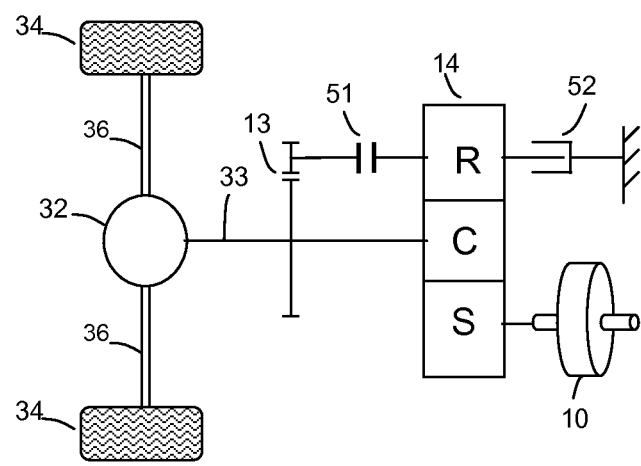
FIG. 12(b) is an equivalent embodiment that is also motorless, using a clutch and a brake instead as the method of control for storing and releasing energy to and from the flywheel.
Figure 12C:
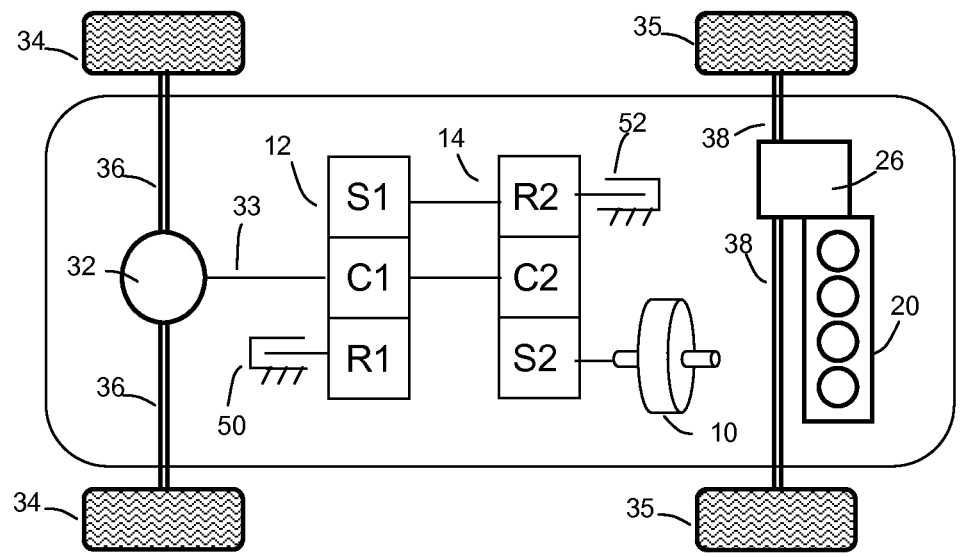
FIG. 12(c) shows how the motorless brake-based embodiment of FIG. 12(a) may be used to turn a conventional vehicle into a hybrid.
Figure 12D:
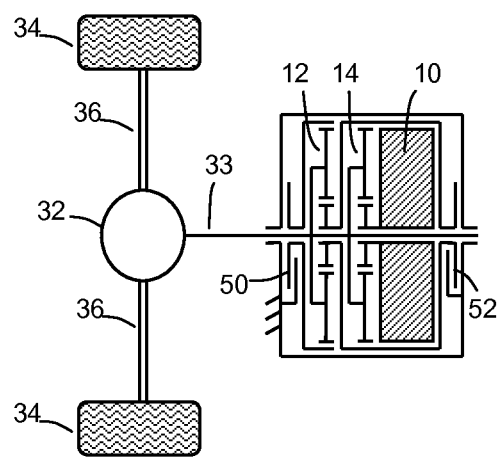
FIG. 12(d) is a mechanical schematic of the brake-based embodiment of FIG. 12(a)

For converting existing vehicles into hybrids, or for new vehicles where the primary focus of fuel efficient design is to recover the vehicle's kinetic energy during deceleration, an embodiment of the present invention includes a brake-based, motorless hybrid system configuration in FIG. 12(a), as well as a variation thereupon in FIG. 12(b).

The flywheel 10 in the configuration of FIG. 12(a) is connected to the sun gear S2 of the planetary gear set 12, designated as port-1. The planetary carrier C1 of the planetary gear set 12 and the planetary carrier C2 of the planetary gear set 14 are connected to each other and to a transmission shaft 33 that is also connected to the wheels 34 through the final drive 32 and the axes 36. Any point along the shaft 33, on the planetary carrier C1, or on the planetary carrier C2 is considered to be on port-2. The brake 50, which may be electrically controlled, is connected to R1 of 12, designated as port-3. The sun gear S1 of 12 and the ring gear R2 of planetary gear set 14 are connected, and comprise port-4, to which the brake 52, which may also be electrically controlled, is connected. For the majority of the time, both brakes 50 and 52 are maintained in the disengaged or "open" position. When deceleration (kinetic energy recovery) or acceleration (kinetic energy release) is desired, the slipping brakes 50 and 52 are the means to change the speed of port-3 and port-4, replacing the motor variator of the previous embodiments and the prior art. They will and should slip when engaging. Only one of the slipping brakes 50 or 52 is used at a time; 50 for deceleration, and 52 for acceleration.

During deceleration, if the brake 50 is engaged, the interaction between the torques on port-3 (ring gear R1) and port-2 (planetary carriers C1 and C2) leads to torque being passed to port-4 (sun gear S1 and ring gear R2). The reaction torque on port-4 results in the flywheel 10 on port-1 accelerating (storing energy). When the brake 50 has completely braked port-4, the flywheel 10's maximum speed can reach $-(k_1 k_2-1)$ times the speed of port-2, where $k_1$ and $k_2$ respectively represent the physical gear ratio of the ring gear to the sun gear in the planetary gear sets 12 and 14. Once this maximum ratio between the speeds of port-1 and port-2 is reached, or perhaps when the speed of port-1 compared to the speed of port-2 is close enough to this ratio, the brake 50 should be released or disengaged, or else the flywheel 10 would actually prevent the vehicle from further decelerating. After this maximum speed ratio is reached and the brake 50 disengaged, the vehicle must be further decelerated by another braking mechanism if further deceleration is desired.

The brake 52 should be engaged if it is desired to release the energy stored in the flywheel 10 for accelerating the vehicle. Braking port-4 with the slipping brake 52 can release energy in the flywheel 10 all the way down to zero. The brake 52 should be disengaged immediately thereafter, or else the flywheel 10 may start spinning in the reverse direction, negatively impacting the vehicle's drivability.

FIG. 12(*b*) demonstrates a variation on the configuration of FIG. 12(*a*). Here, the only changes are the replacement of the planetary gear set 12 with the gear set 13, and the replacement of the brake 50 by the slip clutch 51 that is connected to the gear set 13 and the ring gear R of the planetary gear set 14. The gear set 13 has a fixed gear ratio. To recover kinetic energy during deceleration, the slip clutch 51 is engaged to charge the flywheel 10. If it is assumed that $k_3$ is the physical gear ratio of ring gear R to sun gear S in 14, and $k_4$ is the physical gear ratio of the gear set 13, then in relating the gear speeds of 13 it follows that $\omega_r = -k_4 \omega_c$; it also follows that from substituting $-k_4 \omega_c$ for $\omega_r$ in equation (1) and replacing k with $k_3$, the equation $$\omega_s = (k_3 k_4 + k_3 + 1)\omega_c \qquad (2)$$

can be derived for when the clutch 51 is completely engaged. The flywheel 10 can therefore be charged up to $(k_3 k_4 + k_3 + 1)$ times the vehicle speed $\omega_c$ before the clutch 51 should be disengaged. Releasing the energy stored in the flywheel 10 involves only the brake 52, and the flywheel 10's energy can be totally released to zero before disengaging the brake 52.

FIG. 12(*c*) illustrates an actual implementation of the configuration of FIG. 12(*a*) in a vehicle, similar to FIGS. 4(*a*) and 7(*a*).

FIG. 12(*d*) is a mechanical schematic of FIG. 12(*a*) for an implementation like the one shown in FIG. 12(*c*).

The Preferred Four-Port Embodiment of the Present Invention

FIG. 13 shows the preferred four-port embodiment of the present invention. There are three power sources: an internal combustion (or IC) engine 20, which serves as the prime mover; the motor/generators 01 and 02, electric power sources; and the flywheel 10, which is both a kinetic energy storage and a power source. The motor/generators 01 and 02 are controlled by the controller/inverters 03 and 04, respectively, which draw energy from the battery pack 05. The three different power sources interact with one another through a compound power split transmission, which has four input/output ports. This core unit, henceforth referred to as the compound CVT, is comprised of two planetary gear sets 12 and 14, with the carrier C1 of 12 connected to the ring gear R2 of planetary gear set 14, and with the carrier C2 of planetary gear set 14 connected to the ring gear R1 of 12.

This configuration yields a four port power split system, with port-G coming off the sun gear S1 of 12 that is connected to the variator motor/generator 01, port-F coming off the sun gear S2 of planetary gear set 14 that is connected to the kinetic power source flywheel 10 through the clutch 16, port-W that is connected to C1 and R2 and to the wheels 34 through the final drive 32, and port-EM, which is connected to ring gear R1 and planetary carrier C2 as well as the electric power source motor/generator 02 and the prime power source, the IC engine 20, through the clutch 22 and secured with the one-way clutch 24. The system mainly functions as a flywheel hybrid, and with an adequately large battery pack 05 it can also function as a plug-in flywheel hybrid electric vehicle. The interface to the system 62 contains a series of sensors to the 60, including sensors to detect RPM of the various ports of the CVT, the engine load, and the state of charge of the battery pack 05, and etc. The interface 62 also processes the control signals from the 60 to perform operations to the system, such as providing signals to the controller/inverters 03 and 04 or generating signals to couple or decouple the flywheel 10 and/or the engine 20.

The compound CVT is the key to controlling the system's three power sources. The motion of the rotational components in the compound CVT is governed by the following planetary gear equations:

$$(k_1+1)\omega_{c1} = k_1 + \omega_{s1} \qquad (3)$$

$$(k_2+1)\omega_{c2} = k_2 \omega_{r2} + \omega_{s2} \qquad (4)$$

The constant $k_1$ is the physical gear ratio of the ring gear R1 to the sun gear S1, chosen to fit high efficiency RPM ranges for the motor/generators 01 and 02. The constant $k_2$ is the physical gear ratio of the ring gear R2 to the sun gear S2, chosen in consideration of the energy level of the flywheel 10.

$\omega_{c1}$ and $\omega_{r2}$ represent the angular speed of port-W, directly related to the vehicle speed. $\omega_{r1}$ and $\omega_{c2}$ are the angular speed of port-EM, which is the angular speed of both the motor/generator 02 and the engine 20. $\omega_{s1}$ is the angular speed of port-G and represents the speed of the motor/generator 01, and $\omega_{s2}$ is the angular speed of port-F, which is the speed of the flywheel 10. Supposing that $\omega_w$ is the speed of the wheels 34 (disregarding the final drive 32), $\omega_{em}$ is the speed of both the engine 20 and motor/generator 02, $\omega_g$ is the speed of the motor/generator 01, and $\omega_f$ is the speed of the flywheel 10, we can rewrite equations (3) and (4) as follows.

$$(k_1+1)\omega_w = k_1 \omega_{em} + \omega_g \qquad (5)$$

$$(k_2+1)\omega_{em} = k_2 \omega_w + \omega_f \qquad (6)$$

The speed change(s) of any port(s) will affect the speed(s) of the others. The planetary gear set 12 governed by equation (5) allows the engine 20 and motor/generator 02 to drive the wheels 34, with the motor/generator 01 acting as the variator of this first CVT. Changing the speed of the motor/generator 01 varies the transmission speed ratio, which is $\omega_{em}/\omega_w$. The planetary gear set 14 governed by equation (6) is for the control of the flywheel 10 to store and release its kinetic energy when the clutch 16 is in the engaged position. The speed of the vehicle, $\omega_w$, is used as the variator to control the exchange of kinetic energy between the flywheel 10 and the vehicle.

Figure 14:
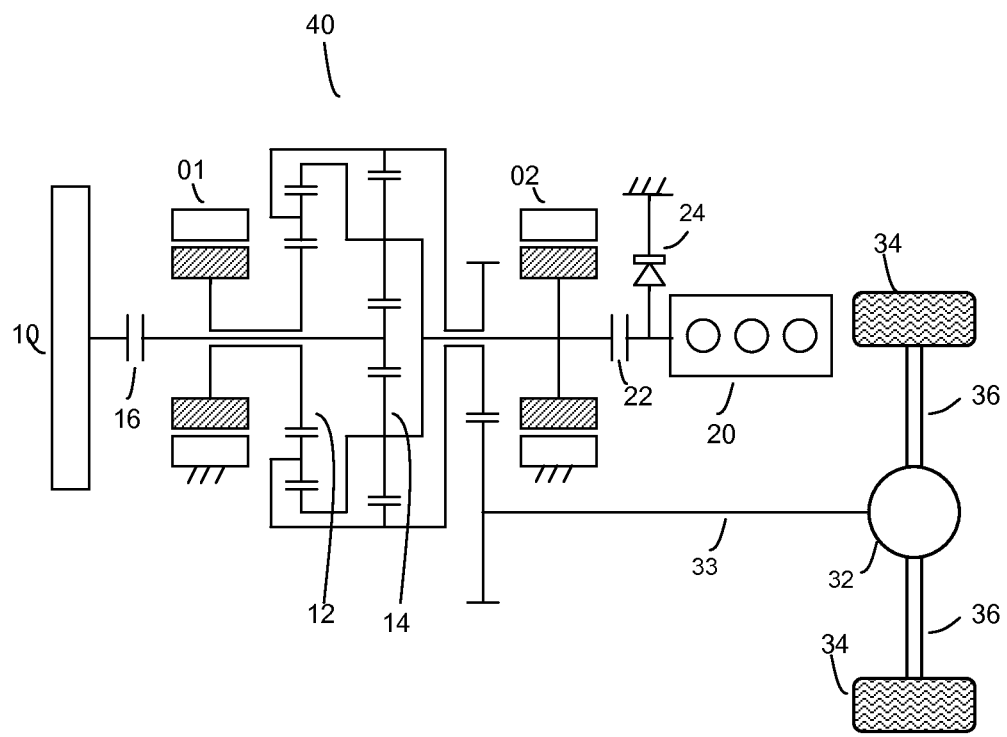
FIG. 14 is a mechanical schematic for the preferred embodiment.

FIG. 14 is one possible mechanical schematic for the core components of the embodiment of FIG. 13. The planetary gear sets 12 and 14 comprise a compound power split device 40 with four ports. A flywheel 10 is connected to a first port through a clutch 16. The motor/generator 01 is connected to a second port. The third port of the compound CVT 40 is connected to the final drive or gearbox 32 through the shaft 33, which is then connected to the vehicle's wheels 34 through wheel axes 36. Both an IC engine 20 and a second motor/generator 02 are connected to the fourth port of the compound CVT 40. The port also features a slip or friction clutch 22 and a one-way clutch 24 for the engine 20.

Even the best physical configuration for a hybrid vehicle needs to be controlled appropriately to achieve the desired characteristics. For control strategies, the two key considerations are performance and efficiency. The present invention also provides two operation methods that optimize these two key considerations; which method is used depends upon whether the vehicle's speed is changing or steady (cruise).

Introducing Inertia and What it Means for Vehicle Propulsion

The energy consumed by the vehicle can generally be categorized into two portions: one portion is used for overcoming frictional forces such as drag and rolling resistance, and is unrecoverable; the other portion of the energy used goes into the kinetic and/or potential energy of the vehicle. When the vehicle is either accelerating or decelerating, the kinetic energy of the vehicle must either increase or decrease. Inertia always plays a negative or resistive role in changing the vehicle's speed. It takes energy to speed the vehicle up, and when the vehicle needs to be slowed or stopped, the vehicle's kinetic energy is dissipated as heat when braking in conventional vehicles. The energy wasted to braking during deceleration is a result of having to overcome the vehicle's inertia. Most of the reserve power from the vehicle's prime mover is for performance during acceleration, also driven by the need to overcome the vehicle's inertia. In other words, a conventional vehicle must be equipped with an engine powerful enough to overcome inertia in short periods of time for acceleration, but this means that for the remainder of the drive, since relatively little power is needed, the vehicle operates at low engine load and, consequently, low efficiency. The tradeoff in performance and efficiency is necessary because of inertia. If there was no inertia, then fuel or electricity used for vehicle propulsion would only be expended for overcoming drag, rolling resistances, and other frictional forces. Removing inertia from the vehicle is the motivation for the method of performing a "de-inertia operation" enabled by the present invention. The system of the present invention offers both improved performance and efficiency while drastically reducing the vehicle's inertial effects.

Overview of De-Inertia Operation Methods

The de-inertia process starts from an initial state wherein the speed of port-W, $\omega_w$, is zero (the vehicle is stationary), and the speed of port-F, $\omega_f$, is high (it is assumed the flywheel 10 was pre-charged or charged from the last deceleration maneuver). By equation (6), therefore, the speed of port-EM equals $\omega_f/(k_2+1)$, and by equation (5) the speed of port-G can be expressed as $-k_1\omega_{em}$ or $-k_1\omega_f/(k_2+1)$. The variator 01 in the planetary gear set 12 thus rotates in the negative direction at the speed $\omega_g=-k_1\omega_f/(k_2+1)$. The engine 20 and the motor/generator 02 rotate in the positive direction at the speed $\omega_{em}=\omega_f/(k_2+1)$, which is controlled within a relatively stable range around the engine 20's RPM that corresponds to its best efficiency state for maximum efficiency. The variator 01 meanwhile rotates in the negative direction, acting as a generator most of the time to provide the reaction force needed to transmit the power from the movers 20 and 02 to the wheels 34 through the direct mechanical path from port-EM to port-W of the CVT (R1 to C1 of 12). By decreasing the speed $\omega_g$ of the variator 01 in the negative direction and having the motor/generator 02 hold $\omega_{em}$ to be relatively steady, the speed $\omega_w$ of the vehicle's wheels increases, since $k_1$ in equation (5) is constant. In the planetary gear set 14, described by equation (6), $k_2$ is also a constant, and the rise of $\omega_w$ while $\omega_{em}$ is constant will cause $\omega_f$ to drop, also releasing energy to port-W and serving to increase $\omega_w$. This is the process of acceleration, whereby the engine 20, whereby the flywheel 10, the motor 02, and/or the engine 20 exchange energy with port-W to accelerate the vehicle. Conversely, increasing $\omega_g$ in the negative direction will cause a decrease in $\omega_w$ and an increase in $\omega_f$ when $\omega_{em}$ is maintained to be constant or near constant, resulting in deceleration while also charging the vehicle's energy into the flywheel 10.

To prevent the flywheel 10 from reducing drivability when vehicle speed is low and there is not enough energy in the flywheel 10, the flywheel 10 can be pre-charged; alternatively, it can also be decoupled from the drivetrain by keeping the clutch 16 in the disengaged position if it is desired to charge the flywheel 10 later, during deceleration. In the pre-charge state (which is also explained in detail later with FIG. 18(a), the IC engine 20 is decoupled temporarily from the drivetrain by keeping the clutch 22 disengaged, while the motor 02 draws energy from the battery pack 05 through the controller/inverter 04 to charge up the flywheel 10. From equation (6), it can be seen that if $\omega_w=0$ (the vehicle is stationary), the flywheel 10 can be charged to $\omega_f=(k_2+1)\omega_{em}$, $k_2+1$ times the speed of the motor/generator 02 up to the maximum safe rotational speed of the flywheel 10.

Note that the speed $\omega_w$ of the wheels 34 is the speed of the vehicle, which directly relates to the kinetic energy level of the vehicle; similarly, the speed $\omega_f$ of the flywheel 10 determines the flywheel 10's kinetic energy level. During acceleration, the vehicle's kinetic energy increases and the flywheel 10's kinetic energy decreases. During deceleration, the vehicle's kinetic energy decreases and the flywheel 10's kinetic energy increases. The vehicle's kinetic energy level and the flywheel 10's kinetic energy level are related, but they change in opposite directions, so that during acceleration kinetic energy is released from the flywheel 10 to speed up the vehicle's wheels 34, and during deceleration the kinetic energy of the vehicle is recovered and stored back into the flywheel 10. The effect is that the flywheel 10 always acts against the vehicle's inertia and reduces or eliminates inertial effects, thus achieving "de-inertia" operation. In the configuration of the present invention, adjusting the speed $\omega_g$ of the motor/generator 01 to suitably control vehicle speed automatically performs the de-inertia function described above during acceleration or deceleration.

Figure 15:
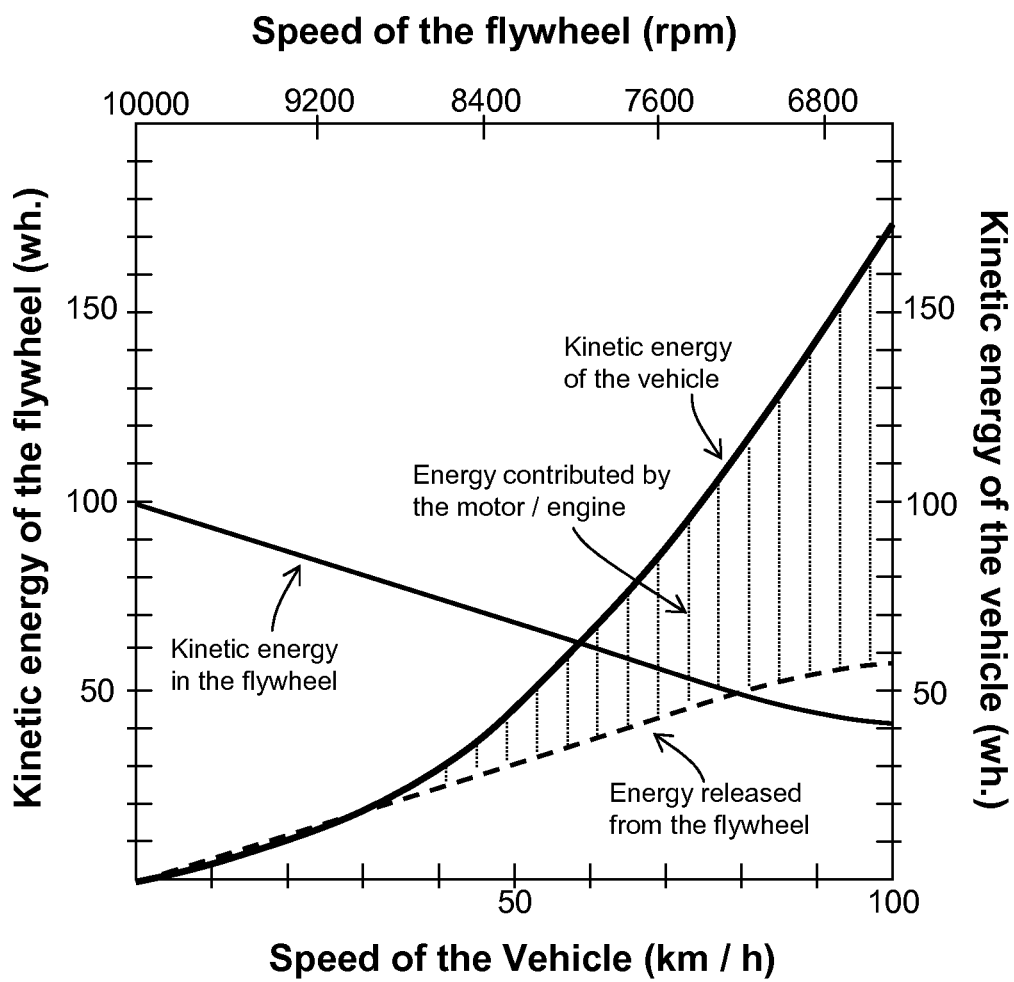
FIG. 15 is a graphical representation of the method of de-inertia operation, and shows how the kinetic energy in the vehicle and the kinetic energy in the flywheel as vehicle speed changes.

FIG. 15 illustrates the kinetic energy exchange between the vehicle and the flywheel 10. For the calculations used to generate this figure it was assumed that the flywheel 10 is a 20 kg steel ring-shaped flywheel with a radius of 18 cm and thickness of 5 cm. When the vehicle is at rest (vehicle speed 0 km/h) it has already been pre-charged to the setting of its maximum safe operation speed, 1040 rad/s or 10,000 RPM. The flywheel in this example at this speed has kinetic energy of about 100 Wh, which is equivalent to the kinetic energy of a 1600 kg vehicle moving at 75 km/h. When the vehicle is stationary, the kinetic energy of the vehicle is zero, while the kinetic energy of the flywheel is at a maximum or at a high level. The kinetic energy of the flywheel is continuously released as $\omega_w$ (vehicle speed) continuously increases, and as vehicle speed increases, the vehicle's kinetic energy increases, and the flywheel's kinetic energy decreases.

In the lower speed range, the vehicle can be boosted to over 30 km/h solely through the energy released from the flywheel 10, while the engine 20 is off and/or decoupled from the hybrid powertrain. Since at and below 30 km/h the flywheel 10 of this example can totally cover the kinetic energy gained by the vehicle, and the motor 02 covers drag and rolling forces, and since the flywheel 10 has a tremendous power density, the vehicle is easily accelerated, and the resulting effect is that it is as though the vehicle has little or no inertia.

As the speed of the vehicle $\omega_w$ gets higher and higher, 02 gradually increases its power to contribute to the vehicle's acceleration. The IC engine 20 may be started to supply power to accelerate the vehicle as $\omega_w$ enters higher speed ranges. The speed of the motor 02 is then controlled to be held at the speed of the engine's ideal efficiency, which is assumed to be 2000 RPM for the purpose of this example. The speed of the variator 01, $\omega_g$, can be controlled to increase $\omega_w$ and accelerate the vehicle (also see FIG. 18(c)).

It is feasible for the present invention to release the energy in the flywheel 10 entirely to zero; for the sake of performance, however, it is better to reserve a certain level of kinetic power in the flywheel 10 even as the vehicle speed increases. In the case of heavier acceleration to a higher speed, the torquer motor/generator 02 can help share the engine load to optimize efficiency. In cases where the heaviest acceleration is desired, the engine 10, motor 02, motor 01, and the flywheel 10 may all contribute driving power for maximum performance of the vehicle (also see FIG. 18(d)).

FIG. 15 may also be used to understand deceleration de-inertia operation. For deceleration, the process starts towards the right side of the graphical representation, when the vehicle speed is high, and works its way left, to where the vehicle speed reaches zero. (See FIGS. 18(h) and 18(i)). The kinetic energy trajectories for the vehicle and for the flywheel 10 remain unchanged; at any given instant, the height of the unshaded area below the dotted line now represents the amount of the vehicle's kinetic energy that can still be stored into the flywheel 10; the difference between the vehicle's kinetic energy trajectory and the dotted line now represents the portion of the vehicle's kinetic energy that can either be regenerated as electricity by the motor/generators 01 and/or 02, or wasted to friction in mechanical braking. Note that this is a non-limiting example, where the size and speed of the flywheel 10 greatly impacts the trajectory of the kinetic energy in the flywheel 10, as well as the dotted line representing how much energy may still be charged into the flywheel 10 at any given vehicle speed.

Figure 16:
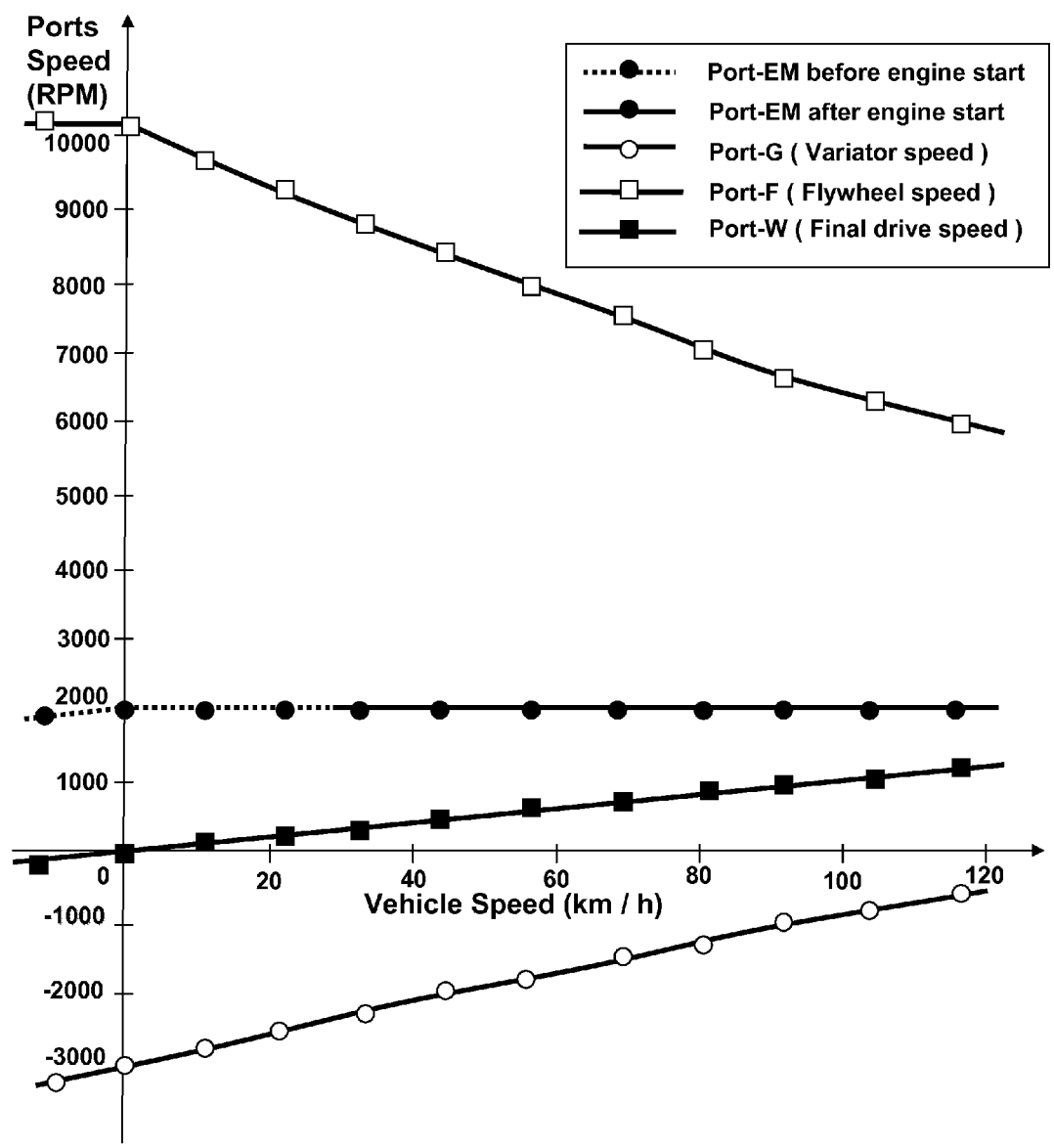
FIG. 16 presents the rotational speeds of the separate ports of the four port compound CVT in the preferred embodiment across a range of vehicle speeds during de-inertia method operation.

FIG. 16 shows the speeds of each of the ports of the compound CVT in the configuration shown in FIG. 13 for acceleration or deceleration. Suppose that the physical gear ratio $k_1$ of the planetary gear set 12 is 1.5 and the physical gear ratio $k_2$ of the planetary gear set 14 is 4. In order to pre-charge the flywheel 10 when the vehicle is stationary, the motor/generator 02 would rotate in the positive direction about 2000 RPM and the motor/generator 01 rotates in the negative direction up to 3000 RPM. The flywheel 10 would then reach the speed of 10000 RPM by the equations (5) and (6). As the vehicle speeds up, port-EM is held steady around 2000 RPM, which is the speed at which the engine 20 and motor 02 work most efficiently; as the variator 01 decreases its speed in the negative direction, the speed of the flywheel 10 decreases and the speed of the final drive 32 and the wheels 34 increases, resulting in de-inertia operation for acceleration. For deceleration, the variator 01 increases its speed in the negative direction, which allows for power to be transferred to the flywheel 10 as the vehicle decelerates. Note that all the motor/generators and the engine are operating at optimal efficiency across a large range of vehicle speed, with the speed of the engine 20 and motor 02 varying only very little or not at all; neither the motor/generator 01 nor 02 cross the zero speed point (very low efficiency for motor/generators) under the normal range of vehicle speeds, a characteristic that vastly improves upon prior art.

Overview of Optimized Efficiency Cruise Operation Methods

"De-inertia operation" methods use the flywheel 10 to diminish the effects of inertia, which comes into play during acceleration and deceleration. Using the flywheel in this manner improves the system's efficiency and increases performance. When a steady vehicle speed is desired, as during cruise, inertia is no longer an issue, and the main concern is fuel efficiency. (A steady vehicle speed may be considered to mean constant, near-constant, or fluctuating only a little within a certain speed range based off a percentage of the vehicle's current speed; for instance, in a non-limiting example, if the current vehicle speed is 100 km/h, a steady speed may fluctuate within a 10 percent vehicle speed range, or 5-15 percent of the current speed, such as 95 km/h to 105 km/h.) For optimized fuel efficiency, it would be undesirable to not take advantage of the flywheel's capabilities and to let it sit there as "dead weight." During a period of driving where steady speed is desired, the flywheel 10 can still be used to improve the vehicle's fuel efficiency. The difference between the steady speed optimized efficiency method of the present invention and the "de-inertia operation" explained earlier is that during a preferred embodiment of steady speed (cruise) operation the flywheel 10 is charged by the engine 20 and then transfers the energy to the vehicle, whereas in a preferred embodiment of "de-inertia operation" the flywheel 10 exchanges energy with the vehicle only.

Figure 21:
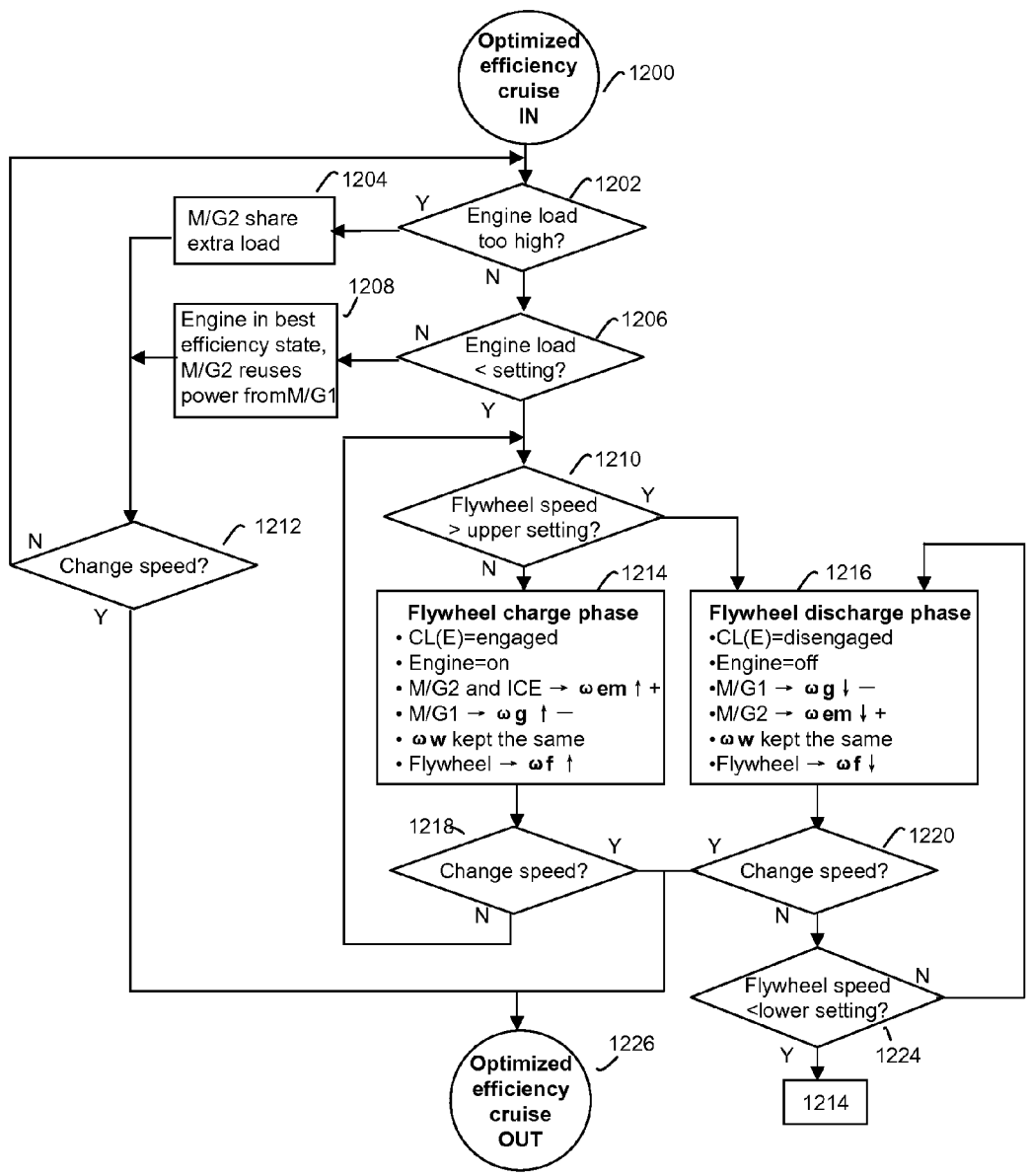
FIG. 21 is a flowchart for optimized efficiency of a cruise mode for a hybrid vehicle with an engine as its prime mover.

In the description that follows regarding optimized efficiency cruise methods, some steps of FIG. 21, a logic flow chart of the optimized efficiency cruise method, is cross referenced, although FIG. 21 will also be explained in detail later. The process of optimized efficiency cruise also corresponds to the operation states shown in FIG. 18(f) and FIG. 18(g).

If the motor 02 is the prime mover, as in the case for an electric vehicle (EV) embodiment, the most efficient control method when driving at a steady speed is simply to adjust the speeds $\omega_{em}$ and $\omega_g$ so that both the motor/generators 01 and 02 are operating in efficient RPM regions of a predetermined efficiency map. Alternatively, the motor/generators 01 and 02 can be dynamically controlled and adjusted in real time to minimize electric current while maintaining the same vehicle speed, which also improves the charge/discharge efficiency in the battery pack 05. In electric vehicle mode, with the engine 20 off and the clutch 22 in the disengaged position, the one-way clutch 24 prevents the motor 02 and the engine 20 from turning in the negative direction, so that the variator motor/generator 01 alone can drive the vehicle in the lower speed range. In the higher speed range, both the motor/generators 01 and 02 work together to provide more power, with both controlled to work at the optimal efficiency possible.

If the engine 20 is the prime mover, as in hybrid vehicle embodiments, the efficiency of the engine 20 should be the focus. Engine efficiency is determined by engine speed and load. The highest efficiency state for a conventional IC engine is usually constrained within a limited range of engine speed $\omega_{em}$ and occurs at a relatively high engine load, close to two-thirds or three-fourths of the maximum torque that the engine 20 can produce. While $\omega_{em}$ is controlled to be in the optimal range, placing a suitably high enough load on the engine 20 is the key to optimizing fuel efficiency. Should the load level be too high for a given vehicle speed (determined in step 1202), such as may be the case when driving uphill or running against a strong wind, the motor/generator 02 acts as a torque adjuster to provide extra power while sharing a portion of the torque with the IC engine 20 to ensure that engine load remains within the most efficient operation region (step 1204). If the engine load is within the most efficient range for the current driving condition (no in step 1202 and also no in step 1206), the motor 02 is operated at just enough minimal power to use the electricity generated by the variator 01 as it controls the CVT ratio (step 1208). If the engine load is too low for a given driving condition, the optimal control strategy is more complicated.

Low engine load means low engine efficiency, and it seems simple to just turn off the engine 20 and let the motor 02 take over as the power source moving the vehicle. However, since in HEVs electric energy may originally be derived from the fuel for the vehicle or another chemical energy source, which has to go through four energy conversions, it may not always be desirable to turn off the engine 20 and let the motor 02 take over due to conversion losses. Suppose that the efficiency for each conversion is 90 percent and mechanical gear to gear transmission loss is ignored, then the efficiency of the electric energy that gets output to the wheels is 0.9^4=0.6561, about 66 percent, which means that 34 percent of the energy was lost to energy conversions. It is thus not advisable to turn off the engine 20 and use only the motor 02 to propel the vehicle unless the efficiency drop from the best efficiency region is more than 34 percent (66 percent relative efficiency or lower; relative efficiency is defined as the engine efficiency under current operation conditions divided by the maximum engine efficiency when operating under optimal conditions for efficiency). Using the motor 02 with electric energy from the battery before the engine efficiency has dropped 34 percent from its best efficiency will use more fuel in the long haul, since more energy has been lost through conversion than the energy that was conserved or gained by operating the engine at the maximum efficiency. When the engine load drops below a certain threshold, which is related to 66 percent relative efficiency in the HEV case, which can be calculated by estimating the conversion losses, the engine 20 is turned off and motor 02 takes over until the state of charge in the battery pack 05 drops to a lower state of charge limit. Then, the engine 20 starts and the variator 01 then acts as a generator to increase the load seen by the engine 20, controlling the engine 20 to work at optimal load and optimal efficiency while $\omega_{em}$ is fixed. The power generated by the variator 01 charges the battery pack 05 until an upper state of charge limit is reached. The engine 20 is then shut off and the motor 02 is then used to drive the vehicle until the lower state of charge limit is reached. Under this control strategy for HEVs, the IC engine 20 is ensured to work at 66 percent relative efficiency or better.

In a preferred embodiment of the present invention, the addition of the flywheel 10 brings a kinetic power source to the vehicle, which will be heretofore referred to as the kinetic hybrid vehicle or KHV. A kinetic hybrid vehicle may be a vehicle that includes a kinetic power source and a kinetic energy storage in addition to having a prime power source (e.g., a prime mover) and the energy source for the prime mover. Since the energy is stored in the flywheel in the same form it is used in, the energy exchange between the flywheel 10 and the wheels 34 of the vehicle takes place along a direct mechanical path, with no energy conversion. There is a mechanic-electric energy split between port-G and port-EM for the control of the CVT ratio. With a compound CVT, typically around 25 or less percent of the total power goes through the electric path, and 75 percent or more of the energy is transferred via a direct mechanical path. The same assumptions used for the HEV example, namely that each energy conversion stage is 90 percent efficient and that the mechanical gear to gear loss is negligible, may be used to estimate the percentage of energy lost to storing and releasing energy to and from the flywheel 10 in the KHV.

The flywheel 10 in the preferred embodiment of the KHV is used as a kinetic energy and kinetic power buffer to enable the prime mover engine 20 to be operated in the most efficient manner. Most of the energy transferred into and out of the flywheel 10 is transferred mechanically, and with negligible loss. What energy conversion losses there are in the KHV comes from the portion of energy that travels the electric path, through the variator 01 and the motor 02 (refer to FIG. 18(*f*) and FIG. 18(*g*)). In each cycle, the energy from the engine 20 travels through the compound CVT at most twice, once when the excess energy is stored into the flywheel 10, and once when energy is released from the flywheel 10. Each time, approximately 25 percent travel the electric path, and that portion of the energy is converted into electricity by the variator 01, then converted back into kinetic energy and used back into the powertrain by the motor 02, so each trip through the compound CVT the portion of energy lost to conversion is 0.25*(1−0.9*0.9), 4.75 percent of the total energy. When energy is stored into the flywheel 10, approximately 75 percent is stored kinetically into the flywheel 10 via a purely mechanical path, 4.75 percent is lost to conversion, and 20.25 percent is stored back into the flywheel 10 via an electromagnetic path by the motor 02. The efficiency for storing kinetic energy to the flywheel 10 is 0.75+0.2025=0.9525, 95.25 percent, compared to 81 percent for HEVs. When energy is released from the flywheel 10, another 4.75 percent is lost to conversion. Recall, however, that originally 95.25 percent of the total energy was stored into the flywheel 10; the percent lost to conversion out of the total energy from the beginning would thus be 0.0475+0.9525*0.0475=0.0475+0.04525= 0.09275, or approximately 9 percent. The overall system efficiency, assuming that gear to gear loss is negligible, is then approximately 91 percent, which is a drastic improvement compared to 66 percent when the same control method is applied to the HEV using the HEV's batteries as the energy buffer instead of the flywheel buffer unique to the KHV. Although in practice mechanical gear to gear losses may decrease the KHV's system efficiency from its estimated value, the same effect also applies to HEVs, so the conclusions drawn from theoretically comparing the KHV to HEVs would still hold in real world applications.

Figure 17:
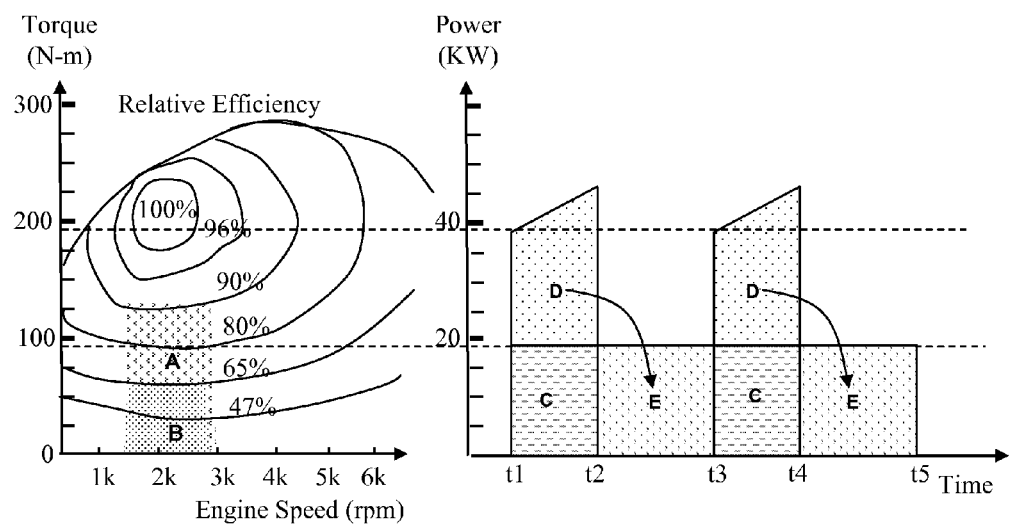
FIG. 17 demonstrates how the engine and the flywheel work together for the method of optimized efficiency cruise.

FIG. 17 presents the difference in efficiencies between the preferred embodiment of the KHV of this invention and conventional HEVs during steady speed operation. On the left side of the figure is an efficiency (or BSFC) map for a conventional internal combustion engine. This engine needs to work around 2000 RPM for best efficiency. The threshold engine load in the preferred embodiment of the KHV of the present invention is about 130 N-m, where the efficiency of the engine is 91 percent of its maximum efficiency. The region below this threshold covers the areas A and B in which the engine of this example can work in a start-stop mode to save fuel and increase efficiency. Meanwhile, the threshold engine load for a typical HEV is about 67 N-m, where the efficiency of the engine is 66 percent of its maximum efficiency. In this case, the HEV can stop the engine only when the engine load has dropped below 67 N-m, i.e. area B. Here is an example: in area A with the preferred embodiment of the KHV of the invention, where the engine efficiency is about 80 percent of maximum efficiency, operating the engine in a start-stop manner yields a relative efficiency increase of 11 percent than if the engine was operated continuously. For a conventional HEV, if the engine operates in a start-stop manner, it's a loss in relative efficiency of 14 percent compared to operating it continuously. Thus the preferred embodiment of the KHV of the present invention is more advantageous for improving fuel economy under a broader range of driving conditions than the typical HEV.

The right side of FIG. 17 illustrates the energy changes during start-stop operation where vehicle speed is held steady. From t1 to t2 and again from t3 to t4 the engine is on, and from t2 to t3 and again from t4 to t5 the engine is off. Each time when the engine is on, the engine's output power can be divided into two portions, indicated by the areas C and D. The area C represents the power needed to maintain the steady speed of the vehicle, and the area D is the excess power generated by the engine in order to operate at optimum efficiency. The excess power represented by D is charged into the flywheel when the engine is on, and released from the flywheel when the engine is off, in area E. A constant level of power is delivered to the wheels throughout.

With a preferred embodiment of the KHV of this invention, it is worthwhile to perform start-stop operation as long as the efficiency of the engine has dropped by 9 percent compared to its highest efficiency. For a preferred embodiment of the KHV of the present invention, the IC engine 20 may work at 91 percent relative efficiency or better, and the engine load that corresponds to 91 percent relative efficiency in the speed range of $\omega_{em}$ can be used as a threshold load condition to trigger start-stop operation of the engine 20. If, with the flywheel 10 decoupled, the engine 20 would be operating at a "current" load below the threshold load condition (step 1206), then the engine 20 is operated at the optimal efficiency load, the output from the engine 20 is split to drive the vehicle with the "current" load or power needed to maintain the current vehicle speed, and to charge the flywheel 10 (step 1214) with the remaining power that is the difference between the optimal efficiency load and the "current" load until the flywheel 10's upper speed setting is reached (step 1210). Once the flywheel 10 has a certain amount of reserve power (upper speeding setting exceeded, step 1210), the flywheel 10 can drive the vehicle when the engine 20 is off (step 1216), with the motor 02 reusing the electric energy generated by the variator 01 to reduce energy conversion losses and prolong the life of the battery pack 05.

In a slightly more condensed form than was described previously, the preferred method to optimize efficiency of cruise (steady vehicle speed) operation for the preferred embodiment of the KHV of the present invention is as follows. If the load is too high (step 1202) from road conditions for the engine 20, the motor 02 shares the extra load and lets the engine 20 work in its most efficient state (step 1204). When the load is just right (step 1208), the motor 02 maintains the minimum power needed to absorb the electricity from the variator 01, and the engine 20 provides the remaining torque needed. If the engine load is below a threshold (determined by step 1206), the engine load is controlled to increase to the highest efficiency load level of the engine 20 (step 1214) by increasing the engine speed $\omega_{em}$ incrementally; the speed of the generator 01, $\omega_g$, is increased $k_1$ times the increment of the change in $\omega_{em}$ in the opposite direction to keep the speed $\omega_w$ of the vehicle stable (equation (5)). At the same time, $\omega_f$, the speed of the flywheel 10, is increased $k_2+1$ times the incremental change in $\omega_{em}$ (equation (6)), so the energy is charged to the flywheel 10 from the engine 20. When the speed $\omega_f$ of the flywheel 10 reaches a preset upper value (determined by step 1210), the engine 20 is turned off (step 1216), and the flywheel 10 is used to drive the wheels 34. At this point, the control goes as follows: the speed $\omega_g$ of the generator (and transmission ratio variator) 01 is decreased $k_1$ times an incremental speed in the negative direction, and the speed of the motor/generator 02, $\omega_{em}$, is decreased that incremental speed in the positive direction to keep $\omega_w$ stable. As a result, the speed $\omega_f$ of the flywheel 10 is decreased by $k_2+1$ times the incremental speed, and energy is released from the flywheel 10 to drive the wheels 34. When $\omega_f$ drops to or below a lower preset value (determined by step 1224), the engine 20 is started again (step 1214) to begin another cycle of this operation, where a portion of the energy is delivered to the vehicle at a constant rate, but another portion is exchanged from the engine 20 to the flywheel 10 and stored in the flywheel 10 until used. The flywheel 10 functions as both an energy storage device and as a power source.

The method of the optimized efficiency cruise operation described above (and described in more detail with FIG. 21) maximizes the use of the flywheel 10, and minimizes the use of the battery pack 05, extending the life of the battery pack 05. The IC engine 20 always works at optimized efficiency when it is on because charging the flywheel 10 while driving the vehicle also increases the engine load for better fuel efficiency. In conventional kinetic hybrid vehicles, the flywheel was of little or no use during cruise, and was only significantly useful during substantial acceleration or deceleration of the vehicle. In preferred embodiments, the present invention optimally uses the flywheel to increase the vehicle's efficiency both in situations where speed changes (de-inertia operation) and in situations where speed is steady (optimized efficiency cruise operation), improving upon conventional methods and systems.

Vehicle Operation States for the Preferred Four-Port Embodiment

FIG. 18 depicts the general range of operation states the vehicle is capable of undergoing with a preferred embodiment of the hybrid powertrain. Some steps are cross-referenced from the corresponding logic flowcharts FIGS. 19-21 to be described in detail later. The operation states 18(a) through 18(m) are listed in the order in which they occur in a typical journey. Again in FIG. 18, the motor/generator 01 is represented as M1 or G1, the motor/generator 02 is represented as M2 or G2, the engine is represented as E, the vehicle's wheels are represented as W, the battery pack is represented as B, and the input/output ports of the planetary gear sets 12 and 14 correspond respectively to the sun gear S1, the planetary carrier C1, and the ring gear R1 for planetary gear set 12 and the sun gear S2, the planetary carrier C2, and the ring gear R2 for planetary gear set 14. Large filled arrows indicate the direction of motion, large unfilled arrows indicate the direction of torque, and the small arrows indicate the direction of energy transfer, while dotted lines indicate the component(s) are decoupled or are not used, and solid lines without arrows indicate a physical connection (same port).

At the beginning of the journey prior to launching the vehicle, it would be desirable to charge up the flywheel F before starting the engine E so that the flywheel F enhances drivability and efficiency. To pre-charge the flywheel F while the vehicle remains stationary and braked at the wheels W, the engine E is decoupled from the drivetrain and the motor M2 draws energy from the battery pack B charge the flywheel F at optimal efficiency, as shown in FIG. 18(a). Since $\omega_w=0$ (wheels W fully braked), from equation (6) it follows that $\omega_f=(k2+1)\omega_{em}$. This means that for every increment of change in the speed of motor M2, the speed in the flywheel F changes by $k_2+1$ times that increment. G1 is electrically off (spinning freely) during pre-charge so that there is no reaction torque to transfer the power from the flywheel F and M2 to the wheels W.

Once the flywheel F is sufficiently charged, the variator G1 produces a reaction force enabling the transfer of kinetic energy from the flywheel F and the motor M2 to the wheels W, which is no longer braked, launching the vehicle from rest. at the time the engine E is connected to the drivetrain or afterwards, and both M2 and the flywheel F may supply the torque needed to start the engine E, depicted by FIG. 18(b).

Following the start of the engine E, the vehicle is launched from rest by the flywheel F and accelerates. In FIG. 18(c), the first mode of acceleration, M2, the engine E, and the flywheel F all contribute torque to accelerate the vehicle, of which the flywheel F is the prime contributor, especially at lower vehicle speeds. G1, the variator, provides the reaction torque necessary to transmit power from the engine E and the flywheel F to the wheels W. Referring to equations (5) and (6), decreasing $\omega_g$ in the negative direction while holding the M2 speed $\omega_{em}$ steady results in an increase in $\omega_w$, the speed of the wheels W and hence vehicle speed. Meanwhile, an increase in $\omega_w$ while $\omega_{em}$ remains steady results in a drop in $\omega_f$, meaning that energy is simultaneously released from the flywheel F to accelerate the vehicle. Occasionally, at very high vehicle speeds when considerable acceleration is still needed, M/G1 can go into the motoring state to transmit more power to the wheels W. Thus in FIG. 18(d), M1, M2, the engine E and the flywheel F can all contribute power to propel the vehicle.

Following acceleration, cruising or coasting may be desired for some period of time. In the coasting state shown in FIG. 18(e), every component of the drivetrain is inactive, which puts the vehicle in neutral. In the first cruise state illustrated in FIG. 18(f), G1 acts as the variator controlling the speed ratio of the CVT, while the power from the engine E is split to charge up the flywheel F and to drive the wheels W, and M2 acts as a torquer motor to use the electricity from G1. Once the maximum safe or desired speed (equivalently, upper desired kinetic energy setting) on the flywheel F has been reached, the engine E can be decoupled from the drivetrain, allowing the flywheel F controlled by the variator 01 to function as the mover in a second cruise state, depicted in FIG. 18(g). Kinetic energy is released from the flywheel F to the wheels W at precisely (or as near precisely as possible) the power needed to maintain the cruise speed of the vehicle. Until cruise is no longer desired, the KHV cycles through the two cruise states of 18(f) and 18(g), alternating between either using the prime mover engine E at its optimal efficiency or not using it at all.

For deceleration, there are also two states. In FIG. 18(h), the system is focused on charging as much energy as possible to the flywheel F, and the variator M1 enters the motoring state to increase the speed of S1 negatively to control the kinetic energy from the wheels W to transfer to the flywheel F via a mechanical path from ring gear R2 to sun gear S2. The engine E is decoupled. The generator G2 produces a braking torque to hold the speed $\omega_{em}$ steady and to supply power to the variator M1. By the planetary gear relationships expressed in equations (5) and (6), the kinetic energy of the vehicle is transferred from the wheels W to the flywheel F via a mechanical path from ring gear R2 to sun gear S2. The second deceleration state, shown in FIG. 18(i), is entered when the flywheel F has been charged to its maximum safe energy capacity. Here, both motor/generators of the system act as generators G1 and G2 to regenerate any remaining kinetic energy left in the vehicle as electricity to be stored in battery pack B.

The last three states of FIG. 18 show miscellaneous other functions desired in the vehicle. Should the state of charge of the battery pack B drop to a very low level, the engine E may be used to charge the battery pack B through G2 while the vehicle coasts or remains stationary, depicted in FIG. 18(j). To reverse the vehicle, shown in FIG. 18(k), M2 drives the wheels directly in the reverse direction, while the generator G1 provides the reaction torque, and both the engine E and the flywheel F are decoupled. Finally, at the end of the drive, the flywheel F may have some energy left over and it may be more desirable to store this energy into the battery pack B; in FIG. 18(m), the flywheel F releases its energy through the generator G2 to the battery pack B while other components of the system are inactive.

Control Methods in More Detail

Start of the Drive and the Vehicle Stationary State

FIGS. 19, 20(a), 20(b), 20(c), and 21 comprise logic flow charts describing the methods to control the system of the invention.

In the flow charts, M/G1 refers to the motor/generator 01, M/G2 refers to the motor/generator 02, and both Engine and ICE refer to the engine 20, while CL(E) refers to the clutch 22 connecting the engine 20 to the drivetrain, and CL(F) refers to the clutch 16 connecting the flywheel 10, which is just expressed as Flywheel.

The vehicle is started at step 1002. When the vehicle is first started, it is presumed that the vehicle is first stationary (step 1004), and the flywheel 10 can be pre-charged while it is stationary. The process represented by step 1004 consists of the steps 1110 through 1124, explained in more detail in FIG. 20(a). At first both the clutches 16 and 22 are disengaged, and the engine 20 and both the motor/generators 01 and 02 are off (step 1112). The vehicle stationary state, apart from the start of the drive, may also apply when the vehicle is stopped temporarily at an intersection or a stop sign. 1110 represents when the system first enters the vehicle stationary loop. The system continually reads in inputs from sensors in its interface 62 or from the vehicle's ECU 60 to evaluate whether the operator's intent is for the vehicle to remain stationary (step 1114). As soon as it is detected that moving the vehicle is desired, determined in step 1114, the system exits the vehicle stationary loop (step 1120) and proceeds on to step 1006.

Battery Charge and Flywheel Charge or Restore

As long as the vehicle remains in the stationary state, the system will make decisions as to whether the battery pack 05 and/or the flywheel 10 should be charged. First, it detects the state of charge in the battery pack 05 and determines in step 1116 whether it needs charging. If so, the system proceeds to step 1118, engaging the clutch 22 to connect the engine 20, which then drives the generator 02 to charge the battery pack 05, as in FIG. 18(j). While the battery pack 05 is being charged the system can continue to monitor whether it is desired for the vehicle to leave the stationary state in step 1114 (through 1118 to 1126 to 1114). Once it is determined that the battery charge is complete (step 1126), the system performs step 1128, shutting off the engine 20 and the generator 02, and disengaging the clutch 22 before returning to

1114. As long as the state of charge in the battery pack 05 is adequate, following 1114 the system proceeds from 1116 to 1122, to see if the flywheel 10 needs charging. If yes, the system executes step 1124, engaging the clutch 16 to connect the flywheel 10, and using the motor 02 to charge up the flywheel 10, as in FIG. 18(*a*). If the flywheel 10 does not need to be charged (step 1122), or if it is still being charged and the charge is not yet complete (step 1130), the system returns to step 1114 to check if it is desired for the vehicle to leave the vehicle stationary state. Whenever it is determined that the vehicle is to leave the stationary state in step 1114, the system exits the loop (step 1120).

Variations on battery charging and flywheel charging. In one conceivable but less preferred variation, the system may determine whether the flywheel 10 needs charging before determining whether the battery pack 05 needs to be charged. In another variation, the steps 1126 and 1128 may be omitted. In another variation, the steps 1130 and 1132 may be omitted. In still another variation, the steps 1126, 1128, 1130, and 1132 may all be omitted. The system would still work with these variations, just at less optimal efficiency.

Of course, another possibility for when the vehicle is stationary is if the end of the drive has been reached (step 1006) and it is time to turn off the vehicle. If so, then the system performs the flywheel restore function that corresponds to the state in FIG. 18(*m*) in step 1014, where energy in the flywheel 10 is converted and stored into the battery pack 05, before shutting down (step 1016). The flywheel restore function is described in more detail by steps 1140 through 1148 in FIG. 20(*c*). In step 1142, the clutch 22 disengages the engine 20 from the drivetrain. The clutch 16 connecting the flywheel 10 to the drivetrain is in the engaged position, allowing the flywheel 10 to drive the generator 02 in step 1144. The flywheel 10 continues to drive the motor 02 until the energy in the flywheel 10 is depleted ($\omega_f = 0$). Once it has been determined that the flywheel 10 has stopped in step 1146, the flywheel restore operation is complete, and the system then exits the loop in step 1148, and the vehicle can shut down.

Driving in Reverse

Figure 19:
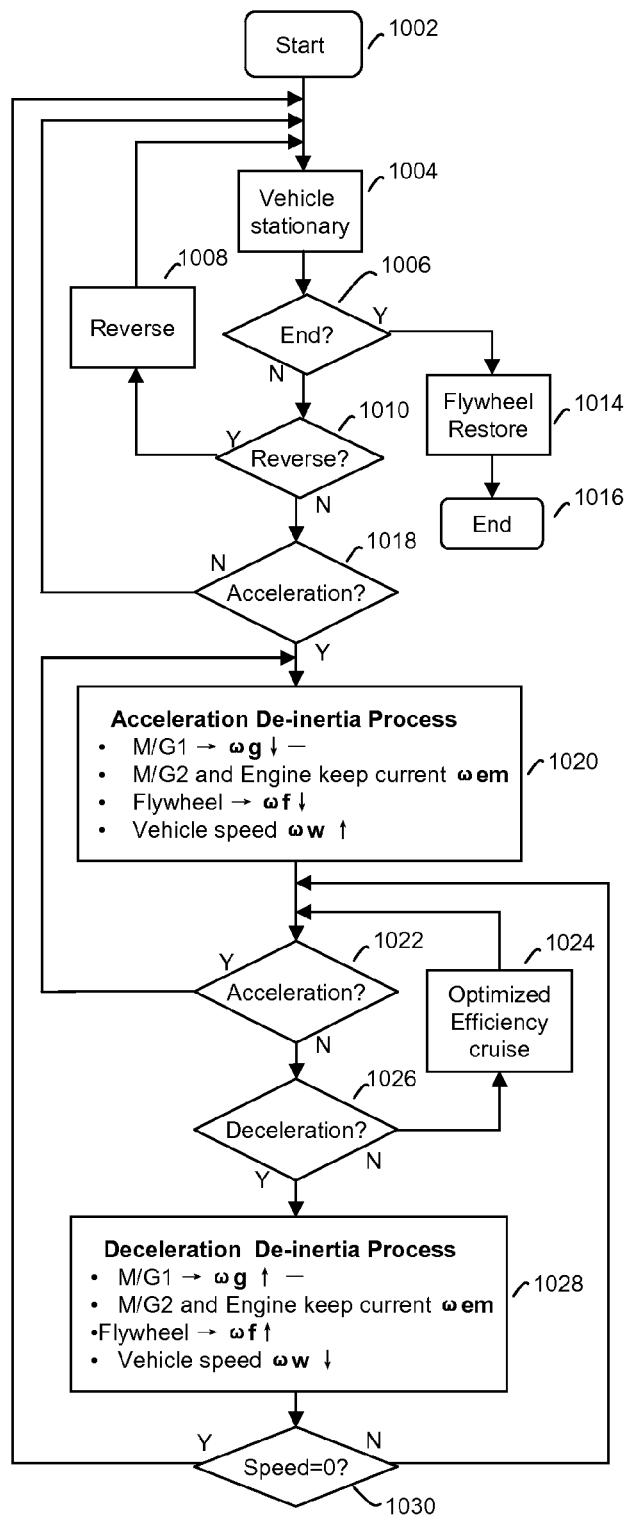
FIG. 19 is a flowchart for controlling a preferred embodiment and for de-inertia methods of acceleration and deceleration.

Once again following the logic flow chart in FIG. 19 from the very beginning, when the vehicle is first started in step 1002, once it is desired for the vehicle to start moving, it may be desirable to reverse the vehicle (step 1010). The reverse state, which is depicted in FIG. 18(*k*), is represented by step 1008 in FIG. 19 and the steps from 1133 through 1138 in FIG. 20(*b*). From step 1010, the system enters the reverse loop, step 1133. To prepare to drive the vehicle in reverse, step 1134, both clutches 22 and 16 are disengaged, the engine 20 is off, and both the motor/generators 01 and 02 are on (01 as a variator/generator, 02 as a motor). For the duration of the drive in reverse (step 1135), the motor 02 provides the power to drive the vehicle, while the variator 01 provides a braking torque so the power from the motor 02 can be transmitted to the wheels 34. The system will continually monitor whether the operator brakes the vehicle, step 1136. As long as the operator has not given a signal to stop the vehicle, the system loops back to step 1135 to keep driving the vehicle in reverse until it is desired that the vehicle should be stopped (step 1136), at which point the system leaves the reverse loop, step 1138.

De-Inertia Acceleration

After the vehicle has been started, and it is not desired to drive the vehicle in reverse (step 1008) or end the drive (step 1006), the system waits for a signal to accelerate the vehicle (step 1018). It is presumed that the system has pre-charged the flywheel 10 in step 1004 of FIG. 19, and more specifically in step 1124 of FIG. 20(*a*), when the vehicle was stationary at the very beginning of the drive, or following a deceleration maneuver. Please also refer back to FIG. 16 for reference to the four different ports and how their rotational speeds are interrelated. In step 1020, or de-inertia acceleration, the flywheel 10 is spinning at some angular velocity, and decreasing the negative angular velocity of port-G while holding port-EM at a steady angular velocity will cause the flywheel velocity $\omega_f$ to decrease and the speed of port-W, which is coupled to the final drive 32 and the wheels 34, to increase, thus increasing the vehicle speed. In this manner the vehicle is accelerated. The system continually checks for signals indicating the end of acceleration (step 1022) and will continue implementing de-inertia acceleration, step 1020 (and FIGS. 18(*c*) and 18(*d*)), until acceleration is no longer needed.

De-Inertia Deceleration

After some period of acceleration has ended (determined in step 1022), the system detects whether it is desired that the vehicle be decelerated, step 1026. The de-inertia deceleration state is represented by step 1028 in FIG. 19 and depicted in FIGS. 18(*h*) and 18(*i*). FIG. 16 can also serve as a reference for how the port speeds are interrelated. In this process, the motor/generator 01 increases its velocity $\omega_g$ on port-G in the negative direction, while the engine 20 and motor/generator 02 hold the speed of port-EM, steady. With $\omega_{em}$ steady and the quantity $\omega_g$ decreasing, $\omega_w$ and the vehicle speed on port-W must decrease (equation (5), FIG. 16). By the planetary relationships of equation (6), this would mean that with the speed of port-EM $\omega_{em}$ steady and the vehicle speed $\omega_w$ decreasing, the flywheel speed $\omega_f$ on port-F must increase, which means that the vehicle's kinetic energy is stored into the flywheel 10. Should deceleration in step 1028 take the vehicle speed all the way down to zero, determined in step 1030, then since that would mean the vehicle is once again stationary, the system returns to step 1004, the vehicle stationary state. If deceleration has occurred from step 1028 but the vehicle speed is not yet zero, then the system returns to step 1022, from where the system can accelerate (step 1020), continue to decelerate (step 1026), or enter optimized efficiency cruise (step 1024).

Optimized Efficiency Cruise

After some period of acceleration, the vehicle can enter into an optimized efficiency cruise state (FIGS. 18(*f*) and 18(*g*)) if deceleration is not desired in step 1026. If neither acceleration nor deceleration is desired (no in step 1022 and in step 1026), then it is equivalent to say that it is desired to maintain the current vehicle speed. If this is the case, then the system enters into optimized efficiency cruise, step 1024, which is also represented in more detail by the steps 1200 through 1226 of FIG. 21. Since the engine 20 is assumed to be the prime mover, it is of the utmost importance to ensure that the engine 20 runs in its best efficiency state. Engine RPM, $\omega_{em}$, is fixed near the speed corresponding to the engine 20's peak efficiency region, while the system of the invention can also adjust engine load with the motor/generator 02 to increase efficiency. The system of the invention will continually monitor any signals generated by the operator of the vehicle to ensure that the operator intends to stay in cruise. Steps 1212, 1218, and 1220 all determine that, in the case that the operator no longer wishes to maintain a steady speed (i.e.

a speed change is desired), the system exits the optimized efficiency state loop in step 1226.

In step 1202, the system detects whether the current engine load or torque value is higher than the load corresponding to the engine 20's best efficiency state. If so, then the motor 02 shares the load in excess using energy from the battery pack 05 to allow the engine 20 to run at a better efficiency. If the engine load is not too high, then the system detects whether the engine load is too low in the next step, step 1206. If the engine load is neither too high nor too low, then because engine speed $\omega_{em}$ is approximately fixed at the ideal speed for efficiency, the system determines that the engine 20 is already running at optimal efficiency, and in step 1208 controls the motor 02 to only reuse the power generated by the variator 01 as the variator 01 behaves mostly as a generator to vary the transmission ratio for the engine 20.

If the engine load is too low, as is usually the case when the vehicle is in cruise, the system proceeds to step 1210 to determine whether the flywheel 10 has enough energy stored to drive the vehicle on its own for a period of time. During cruise the flywheel speed $\omega_f$ is controlled to be no lower than a lower setting and no higher than an upper setting. The lower setting represents power reserved in the flywheel 10 in the event that it is desired to stop cruising and accelerate the vehicle. The difference between the maximum safe flywheel speed and the upper setting represents the amount of energy the flywheel 10 can still safely recapture in case of deceleration. These lower and upper speed settings for the flywheel 10 under cruise can be predetermined or dynamically determined according to parameters such as vehicle speed, which can be read from the interface to the system 60 or the vehicle's ECU 62.

Should the flywheel speed $\omega_f$ be greater than the upper setting in step 1210, it means the flywheel 10 has enough energy stored to drive the vehicle on its own (FIG. 18(g)), and the system proceeds to step 1216 to release energy from the flywheel 10 to the vehicle's wheels 34. The engine 20 is temporarily turned off and disengaged by keeping the clutch 22 "open". Hence, with the engine 20 disengaged the speed of port-EM, $\omega_{em}$, is maintained by the motor 02. If the variator G1 changes its speed $\omega_g$ by a certain increment, then by equation (5) $\omega_{em}$ must change in the opposite direction by $1/k_1$ times that increment to maintain the same vehicle speed $\omega_w$ for cruise. Since $\omega_w$ is also steady in equation (6), any incremental change in $\omega_{em}$, the speed of M2, will be accompanied by a change of $(k_2+1)$ times that increment in $\omega_f$, the speed of the flywheel F, to maintain steady vehicle speed.

After discharging the flywheel in step 1216, the system proceeds to step 1220 to make sure that the vehicle should still be operated in cruise. Then as long as the flywheel speed is above the lower setting in step 1224, the system continues to release energy from the flywheel to maintain a steady vehicle speed while the engine is off, step 1216, FIG. 18(g). Once the flywheel speed $\omega_f$ drops lower than the lower setting, then it becomes desirable to store more energy into the flywheel 10, and as long as a speed change is not desired in step 1220, the system proceeds to step 1214 to charge the flywheel 10, FIG. 18(f). If a speed change is desired in step 1220, it marks the end of the optimized efficiency cruise loop and the system exits (step 1226).

If in step 1210 it is determined that the flywheel speed $\omega_f$ is not above the upper setting, or if the flywheel speed $\omega_f$ has already dropped below some lower setting in step 1224, the system then charges the flywheel 10 up to the upper setting (FIG. 18(f)) in step 1214. For step 1214 the clutch 22 is held in the "closed" position to engage the engine 20, and both the engine 20 and the motor 02 increase their speed to operate at the ideal RPM for the engine 20's best efficiency state. The motor/generator 01 increases its speed $\omega_g$ in the negative direction, and the flywheel speed $\omega_f$ increases as it is charged (also see FIG. 16). Functionally, what is happening is that the engine 20 and motor/generator 02 drive the vehicle, and the variator 01 splits the power from port-EM in FIG. 13 so that just enough power goes to port-W to maintain a steady vehicle speed, and the rest of the power goes to charge the flywheel 10 on port-F, illustrated in FIG. 18(f). After step 1214, the system once again determines whether a speed change is desired in step 1218. If not, then the system returns to step 1210. If yes, the system then goes to step 1226 and exits the optimized efficiency cruise operation loop.

Other Four-Port (Compound CVT) Configurations

Figure 22:
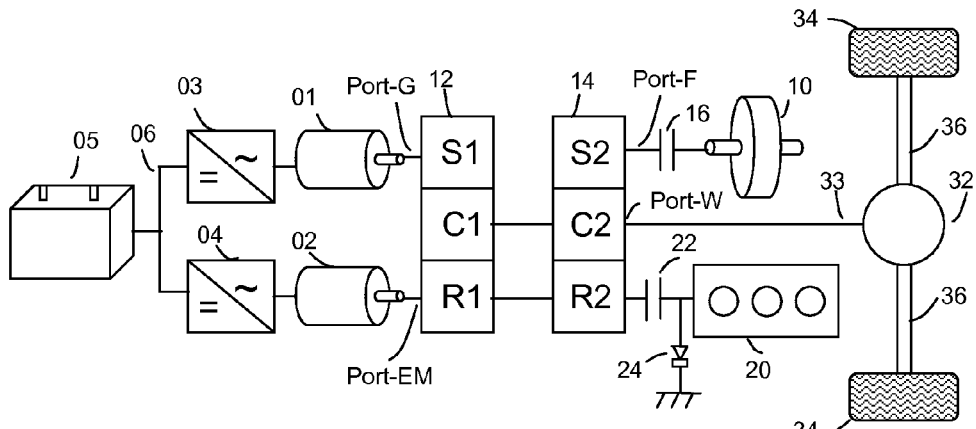
FIG. 22 shows a second four-port embodiment of the present invention.

FIG. 22 demonstrates an alternative configuration. The difference between this configuration with the first preferred configuration in FIG. 13 is that the carrier C1 of the planetary gear set 12 is connected to the carrier C2 of the planetary gear set 14 and the ring gear R1 of the planetary gear set 12 is connected to the ring gear R2 of the planetary gear set 14. The resulting planetary gear equations derived from (3) and (4):

$$(k_1+1)\omega_w = k_1\omega_{em} + \omega_g \quad (7)$$

$$(k_2+1)\omega_w = k_2\omega_{em} + \omega_f \quad (8)$$

The configuration in FIG. 22 functions almost equally well except for the fact that the physical gear ratio $k_2$ should be increased by 1 to achieve the same flywheel speed $\omega_f$ with the same increment in $\omega_{em}$ as compared to the configuration of FIG. 13.

Figure 23:
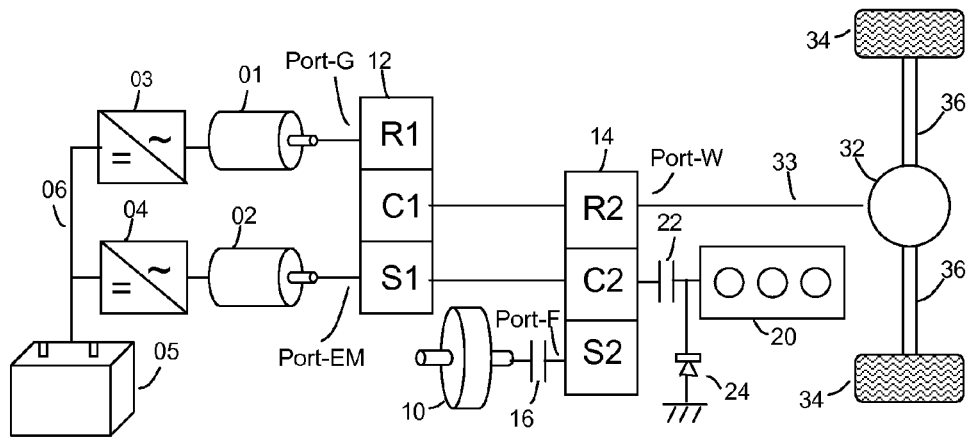
FIG. 23 is a third four-port embodiment of the invention.
Figure 24:
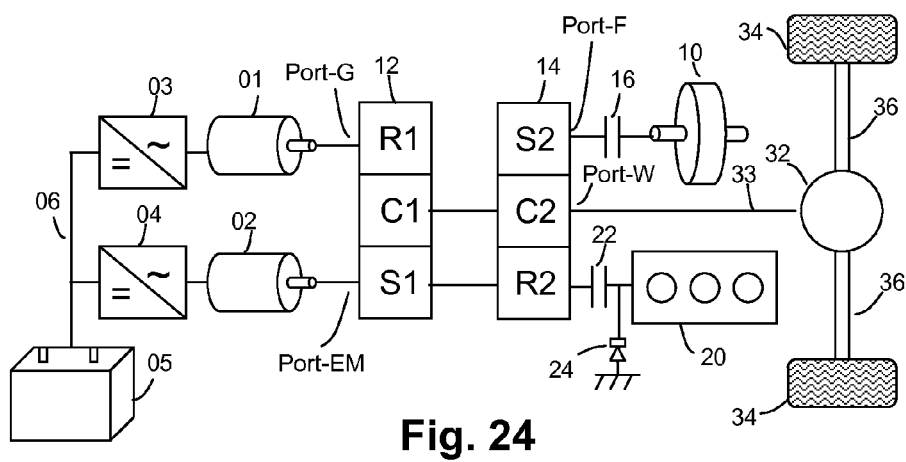
FIG. 24 is a fourth four-port embodiment of the invention.

For the alternative configurations shown in FIG. 23 and FIG. 24, the variator 01 is connected to the ring gear R1 instead of the sun gear S1 in the planetary gear set 12. This change affects the speed range of the variator 01 so that it may have to work from negative to positive RPM as the vehicle speeds up. This signifies that there will be a zero speed point which is inefficient because it is a momentary point of stall. Otherwise these two configurations will also work.

For the configuration of FIG. 23 the planetary equations are:

$$(k_1+1)\omega_w = k_1\omega_g + \omega_{em} \quad (9)$$

$$(k_2+1)\omega_{em} = k_2\omega_w + \omega_f \quad (10)$$

For the configuration of FIG. 24 the planetary equations are:

$$(k_1+1)\omega_w = k_1\omega_g + \omega_{em} \quad (11)$$

$$(k_2+1)\omega_w = k_2\omega_{em} + \omega_f \quad (12)$$

The relationship between the configurations of FIG. 23 and FIG. 24 is similar to the relationship between the configurations of FIG. 13 and FIG. 22. To achieve the same flywheel speed $\omega_f$, the configuration in FIG. 24 needs to have $k_2$ increased by 1 to match the output of the configuration in FIG. 23. Any other compound CVT configurations, where the flywheel 10 is not on the sun gear S2, are not practical since less energy can be stored.

What is claimed is:

1. A powertrain for a kinetic hybrid vehicle, comprising:
   i. a planetary gear system configured as a continuously variable, compound power-split transmission comprising a first port, a second port, a third port, and a fourth port;
   ii. a flywheel connected to the first port of the planetary gear system through a first clutch;

iii. a final drive of the vehicle, the final drive being connected to the second port of the planetary gear system;

iv. a first motor/generator directly connected to the third port;

v. a second motor/generator directly connected to the fourth port; and vi. an engine powered by internal combustion directly connected to the fourth port through a second clutch.

2. The powertrain of claim 1, wherein the powertrain is configured to maintain a current speed of the kinetic hybrid vehicle within a speed range by operating in a cruise mode that comprises a first cruise part and a second cruise part, wherein the powertrain is configured to operate in the first cruise part of the cruise mode by simultaneously driving the final drive of the kinetic hybrid vehicle using the engine while the engine is operated within a peak efficiency range, and charging the flywheel using an excess power from the engine that exceeds the a maintaining power needed to drive the final drive of the kinetic hybrid vehicle such that the vehicle stays within the speed range, and the powertrain is configured to operate in the second cruise part of the cruise mode by driving the final drive using the flywheel.

3. The powertrain of claim 2, wherein the second clutch is configured to selectively connect the engine and the planetary gear system at the fourth port.

4. The powertrain of claim 1, wherein the planetary gear system is comprised of a first planetary gear set and a second planetary gear set, the first planetary gear set comprising a first sun gear, a first carrier, and a first ring gear, the second planetary gear set comprising a second sun gear, a second carrier, and a second ring gear.

5. The powertrain of claim 4, wherein the first port comprises a mechanical connection to the second sun gear.

6. The powertrain of claim 5, wherein the first carrier is connected to the second ring gear.

7. The powertrain of claim 6, wherein the second port comprises a mechanical connection to the first carrier and the second ring gear, the third port comprises a mechanical connection to the first sun gear, and the fourth port comprises a mechanical connection to the first ring gear and the second carrier.

8. The powertrain of claim 6, wherein the first sun gear is connected to the second carrier, and wherein the second port comprises a mechanical connection to the first carrier and second ring gear, the third port comprises a mechanical connection to the first ring gear, and the fourth port comprises a mechanical connection to the first sun gear and second carrier.

9. The powertrain of claim 5, wherein the first carrier is connected to the second carrier gear.

10. The powertrain of claim 9, wherein the first ring gear is connected to the second ring gear, and wherein the second port comprises a mechanical connection to the first carrier and second carrier, the third port comprises a mechanical connection to the first sun gear, and the fourth port comprises a mechanical connection to the first ring gear and second ring gear.

11. The powertrain of claim 9, wherein the first sun gear is connected to the second ring gear, and wherein the second port comprises a mechanical connection to the first carrier and second carrier, the third port comprises a mechanical connection to the first ring gear, and the fourth port comprises a mechanical connection to the first sun gear and second ring gear.

* * * * *